(12) United States Patent  (10) Patent No.: US 8,574,456 B2
Wittek et al.  (45) Date of Patent: Nov. 5, 2013

(54) LIQUID-CRYSTALLINE MEDIUM AND LIQUID CRYSTAL DISPLAY

(75) Inventors: Michael Wittek, Darmstadt (DE); Brigitte Schuler, Grossostheim (DE); Volker Reiffenrath, Rossdorf (DE); Mark Goebel, Darmstadt (DE); Markus Czanta, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 89 days.

(21) Appl. No.: 12/918,511

(22) PCT Filed: Feb. 18, 2009

(86) PCT No.: PCT/EP2009/001129
§ 371 (c)(1),
(2), (4) Date: Aug. 20, 2010

(87) PCT Pub. No.: WO2009/103495
PCT Pub. Date: Aug. 27, 2009

(65) Prior Publication Data
US 2011/0001089 A1  Jan. 6, 2011

(30) Foreign Application Priority Data
Feb. 20, 2008 (DE) .......................... 10 2008 010 193

(51) Int. Cl.
C09K 19/12 (2006.01)
C09K 19/52 (2006.01)
C09K 19/06 (2006.01)
C09K 19/34 (2006.01)
C09K 19/00 (2006.01)
C07D 319/06 (2006.01)
C07D 319/00 (2006.01)

(52) U.S. Cl.
USPC .............. 252/299.66; 252/299.01; 252/299.6; 252/299.61; 549/200; 549/356; 549/357; 549/369; 428/1.1

(58) Field of Classification Search
USPC ................ 252/299.01, 299.6, 299.61, 29.66; 549/200, 356, 357, 369; 428/1.1
See application file for complete search history.

(56) References Cited

U.S. PATENT DOCUMENTS

| 5,494,606 A | * | 2/1996 | Reiffenrath et al. ..... 252/299.61 |
| 2006/0278850 A1 | | 12/2006 | Czanta et al. |
| 2007/0221880 A1 | | 9/2007 | Czanta et al. |
| 2010/0320420 A1 | * | 12/2010 | Hirschmann et al. .... 252/299.61 |

FOREIGN PATENT DOCUMENTS

| DE | 102005027762 A1 | 1/2006 |
| DE | 102005027762 W | 1/2006 |
| WO | 2004106460 A1 | 12/2004 |
| WO | PCT/EP09/01129 R | 6/2009 |

* cited by examiner

*Primary Examiner* — Geraldina Visconti
(74) *Attorney, Agent, or Firm* — Millen, White, Zelano & Branigan, P.C.

(57) ABSTRACT

The invention relates to a liquid-crystalline medium comprising one or more compounds of the formula I

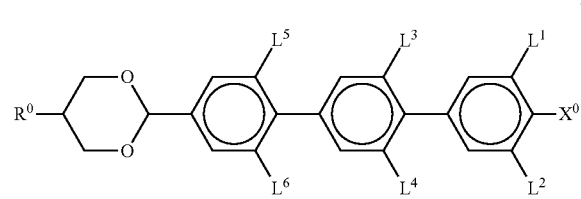

in which
$R^0$, $X^0$ and $L^{1-6}$ have the meanings indicated in Claim 1, and to the use thereof in electro-optical liquid-crystal displays.

24 Claims, No Drawings

LIQUID-CRYSTALLINE MEDIUM AND LIQUID CRYSTAL DISPLAY

The present invention relates to a liquid-crystalline medium (LC medium), to the use thereof for electro-optical purposes, and to LC displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure. In addition, there are also cells which work with an electric field parallel to the substrate and liquid-crystal plane, such as, for example, IPS (in-plane switching) cells. TN, STN, FFS (fringe field switching) and IPS cells, in particular, are currently commercially interesting areas of application for the media according to the invention.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal–insulator–metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEK1-GUCHI, K., TANABE, H., YAMAMOTO, E., SORIMACHI, K., TAMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the trans-missive TFT-TN displays which are generally conventional, the use of liquid crystals of low birefringence ($\Delta n$) is necessary in order to achieve low optical retardation ($d \cdot \Delta n$). This low optical retardation results in usually acceptably low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

For TV and video applications, displays having fast response times are required in order to be able to reproduce multimedia content, such as, for example, films and video games, in near-realistic quality. Such short response times can be achieved, in particular, if liquid-crystal media having low values for the viscosity, in particular the rotational viscosity $\gamma_1$, and having high optical anisotropy ($\Delta n$) are used.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:
  extended nematic phase range (in particular down to low temperatures)
  the ability to switch at extremely low temperatures (outdoor use, automobiles, avionics)
  increased resistance to UV radiation (longer lifetime)
  low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In particular in the case of LC displays for TV and video applications (for example LCD TVs, monitors, PDAs, notebooks, games consoles), a significant reduction in the response times is desired. A reduction in the layer thickness d ("cellap") of the LC medium in the LC cell theoretically results in faster response times, but requires LC media having higher birefringence $\Delta n$ in order to ensure an adequate optical retardation (d·$\Delta n$). However, the LC materials of high birefringence known from the prior art generally also have high rotational viscosity at the same time, which in turn has an adverse effect on the response times. There is therefore a demand for LC media which simultaneously have fast response times, low rotational viscosities and high birefringence.

The invention is based on the object of providing media, in particular for MLC, TN, STN, FFS or IPS displays of this type, which have the desired properties indicated above and do not exhibit the disadvantages mentioned above or only do so to a lesser extent. In particular, the LC media should have fast response times and low rotational viscosities at the same time as high birefringence. In addition, the LC media should have a high clearing point, high dielectric anisotropy and a low threshold voltage.

It has now been found that this object can be achieved if LC media comprising one or more compounds of the formula I are used. The compounds of the formula I result in mixtures having the desired properties indicated above.

The invention relates to a liquid-crystalline medium, characterised in that it comprises one or more compounds of the formula I

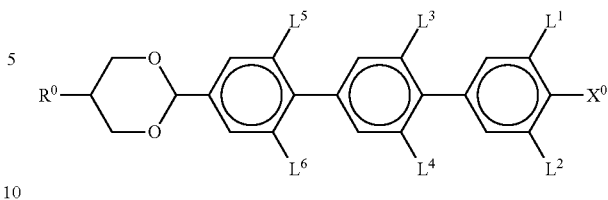

in which
$R^0$ denotes an alkyl or alkoxy radical having 1 to 15 C atoms, where, in addition, one or more $CH_2$ groups in these radicals may each be replaced, independently of one another, by —C≡C—, —$CF_2$O—, —CH=CH—,

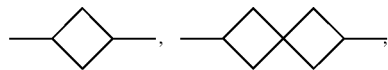

—O—, —CO—O— or —O—CO— in such a way that O atoms are not linked directly to one another, and where, in addition, one or more H atoms may be replaced by halogen,
$X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, and
$L^{1-6}$ each, independently of one another, denote H or F.

Surprisingly, it has been found that LC media comprising compounds of the formula I have a very good ratio of rotational viscosity $\gamma_1$ and clearing point, a high value for the optical anisotropy $\Delta\varepsilon$ and high birefringence $\Delta n$, as well as fast response times, a low threshold voltage, a high clearing point, high positive dielectric anisotropy and a broad nematic phase range. Furthermore, the compounds of the formula I are very readily soluble in liquid-crystalline media.

The compounds of the formula I have a broad range of applications. Depending on the choice of substituents, they can serve as base materials of which liquid-crystalline media are predominantly composed; however, liquid-crystalline base materials from other classes of compound can also be added to the compounds of the formula I in order, for example, to modify the dielectric and/or optical anisotropy of a dielectric of this type and/or to optimise its threshold voltage and/or its viscosity.

Preferred compounds of the formula I are mentioned below:

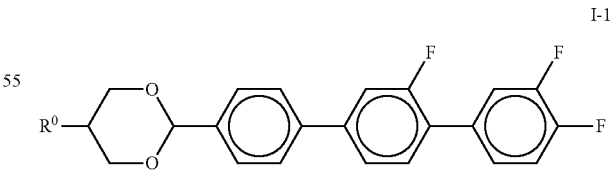

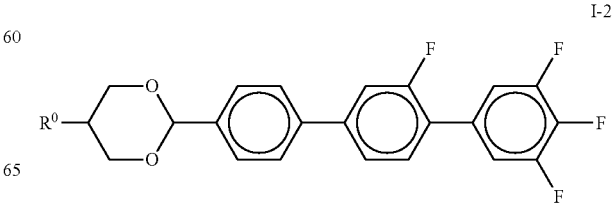

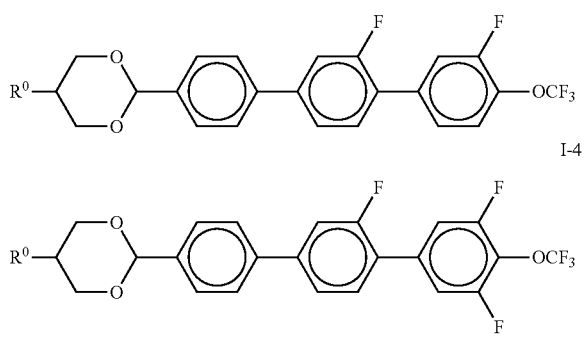

in which $R^0$ has the meanings indicated above and preferably denotes straight-chain alkyl. Particular preference is given to the compounds of the formulae I-2 and I-4, preferably in which $R^0$ denotes $C_2H_5$, n-$C_3H_7$ or n-$C_5H_{11}$.

In the pure state, the compounds of the formula I are colourless and form liquid-crystalline mesophases in a temperature range which is favourably located for electro-optical use. They are stable chemically, thermally and to light.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

If $R^0$ in the formulae above and below denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^0$ denotes an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl. These radicals may also be mono- or polyhalogenated.

If $R^0$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CH_2F$, $OCFHCF_2CF_3$, $OCFHCF_2CHF_2$, $OCH=CF_2$, $OCF=CF_2$, $OCF_2CHFCF_3$, $OCF_2CF_2CF_3$, $OCF_2CF_2CClF_2$, $OCClFCF_2CF_3$, $CF=CF_2$, $CF=CHF$ or $CH=CF_2$, very particularly preferably F or $OCF_3$.

Particular preference is given to compounds of the formula I in which $X^0$ denotes F or $OCF_3$. Further preferred compounds of the formula I are those in which $R^0$ denotes straight-chain alkyl or alkoxy having 1 to 8 C atoms or straight-chain alkenyl or alkenyloxy having 2 to 7 C atoms. In the compound of the formula I, $L^5$ and $L^6$ preferably both denote H, $L^3$ preferably denotes F. $L^1$ and $L^2$ preferably both denote F.

Further preferred embodiments are indicated below:

The medium additionally comprises one or more neutral compounds of the formulae II and/or III:

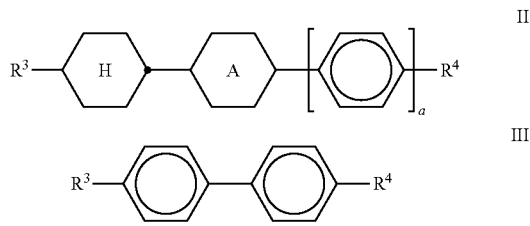

in which

A denotes 1,4-phenylene or trans-1,4-cyclohexylene, a is 0 or 1, and $R^3$ denotes alkenyl having 2 to 9 C atoms, and $R^4$ has the meaning indicated for $R^0$ in formula I and preferably denotes alkyl having 1 to 12 C atoms or alkenyl having 2 to 9 C atoms.

The compounds of the formula II are preferably selected from the following formulae:

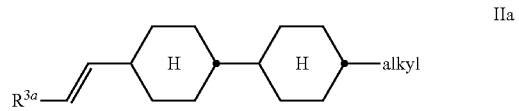

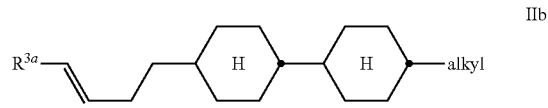

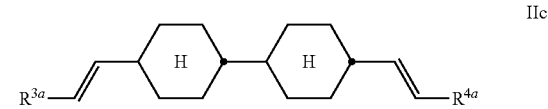

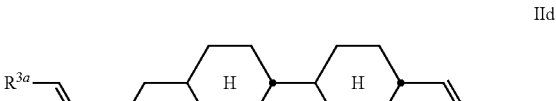

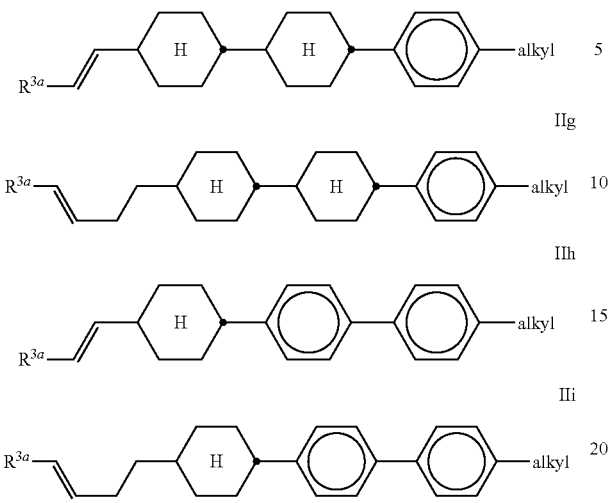

in which $R^{3a}$ and $R^{4a}$ each, independently of one another, denote H, $CH_3$, $C_2H_5$ or $C_3H_7$, and "alkyl" denotes a straight-chain alkyl group having 1 to 8 C atoms. Particular preference is given to compounds of the formulae IIa and IIf, in particular in which $R^{3a}$ denotes H or $CH_3$, and compounds of the formula IIc, in particular in which $R^{3a}$ and $R^{4a}$ denote H, $CH_3$ or $C_2H_5$.

Preference is furthermore given to compounds of the formula II which have a non-terminal double bond in the alkenyl side chain:

Very particularly preferred compounds of the formula II are the compounds of the formulae

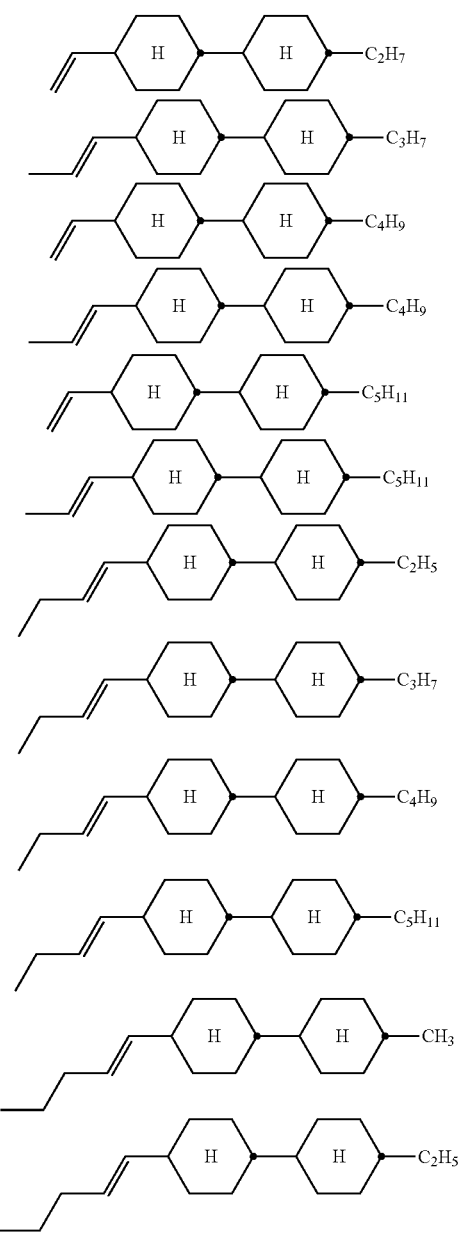

-continued

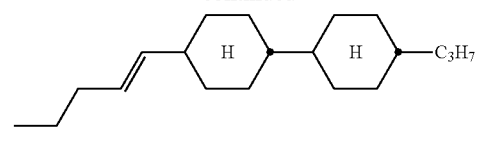
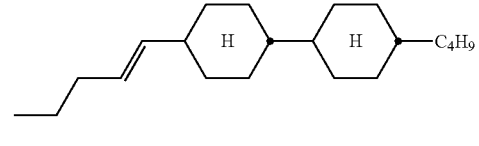
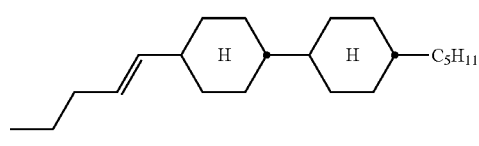
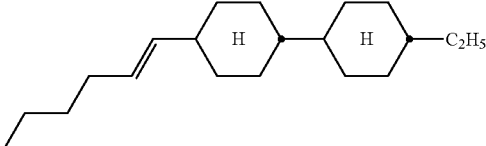
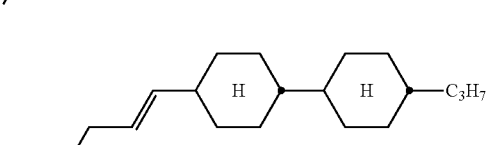
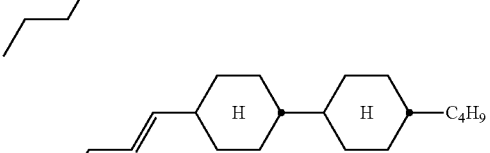
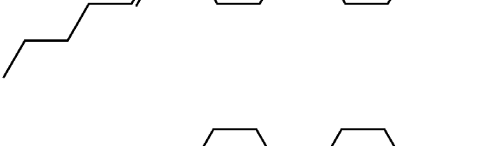

The compounds of the formula III are preferably selected from the following formulae:

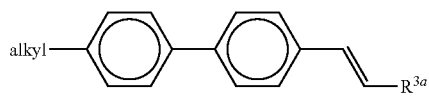

IIIa

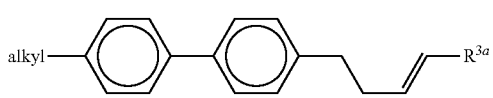

IIIb in which "alkyl" and $R^{3a}$ have the meanings indicated above, and $R^{3a}$ preferably denotes H or $CH_3$. Particular preference is given to compounds of the formula IIIb;

The medium preferably additionally comprises one or more compounds selected from the following formulae:

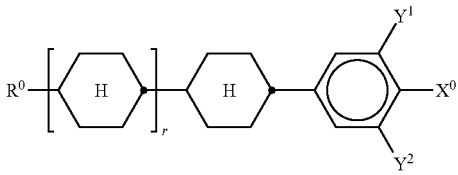

IV

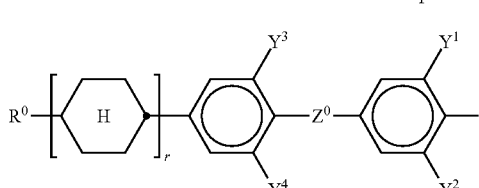

V

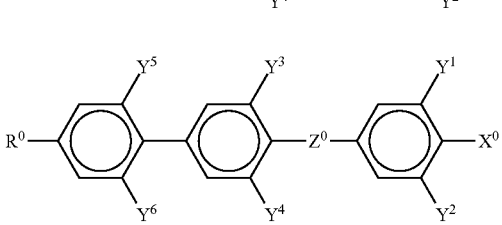

VI

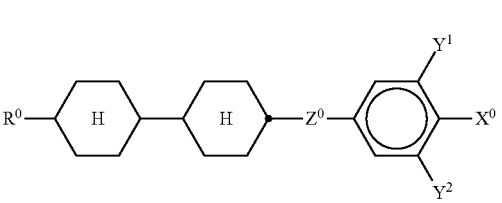

VII

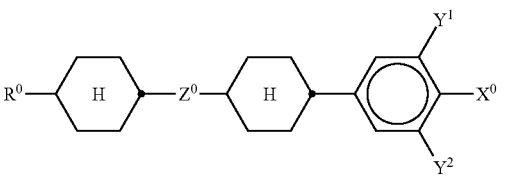

VIII in which $R^0$ and $X^0$ have the meanings indicated in formula I, and
$Y^{1-6}$ each, independently of one another, denote H or F,
$Z^0$ denotes $-C_2H_4-$, $-(CH_2)_4-$, $-CH=CH-$, $-CF=CF-$, $-C_2F_4-$, $-CH_2CF_2-$, $-CF_2CH_2-$, $-CH_2O-$, $-OCH_2-$, $-COO-$, $-CF_2O-$ or $-OCF_2-$, in the formulae V and VI also a single bond, and
r denotes 0 or 1.

In the compounds of the formulae IV to VIII, $X^0$ preferably denotes F or $OCF_3$, furthermore $OCHF_2$, $CF_3$, $CF_2H$, Cl, $OCH=CF_2$. $R^0$ is preferably straight-chain alkyl or alkenyl having up to 6 C atoms.

The compounds of the formula IV are preferably selected from the following formulae:

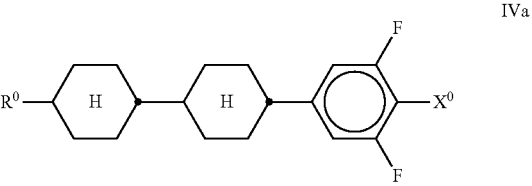

IVa

-continued

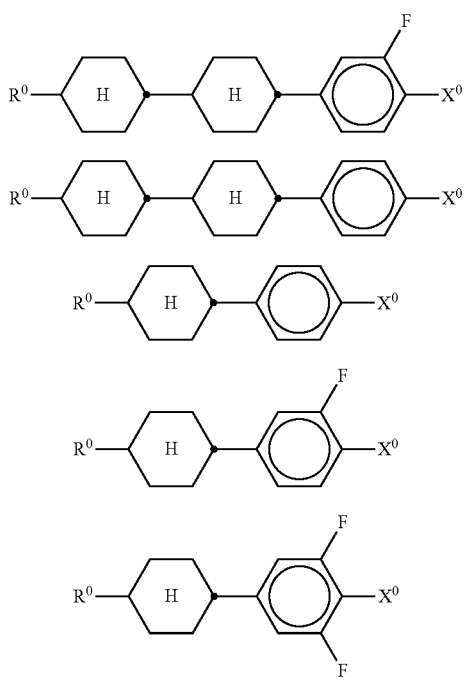

in which R⁰ and X⁰ have the meanings indicated above.

Preferably, R⁰ in formula IV denotes alkyl having 1 to 8 C atoms and X⁰ denotes F, Cl, OCHF₂ or OCF₃, furthermore OCH=CF₂. In the compound of the formula IVb, R⁰ preferably denotes alkyl or alkenyl. In the compound of the formula IVd, X⁰ preferably denotes Cl, furthermore F.

The compounds of the formula V are preferably selected from the following formulae:

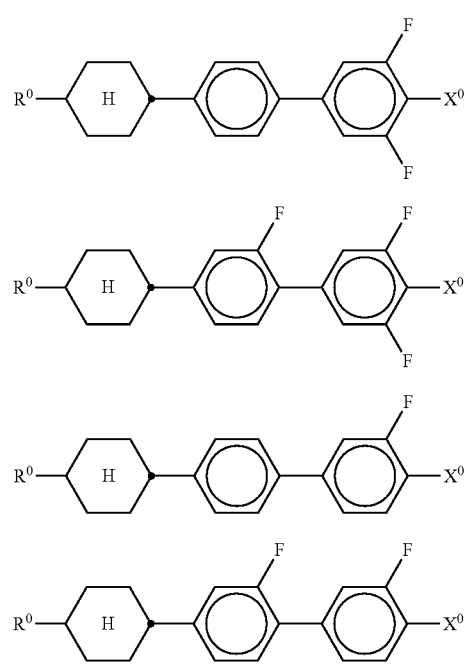

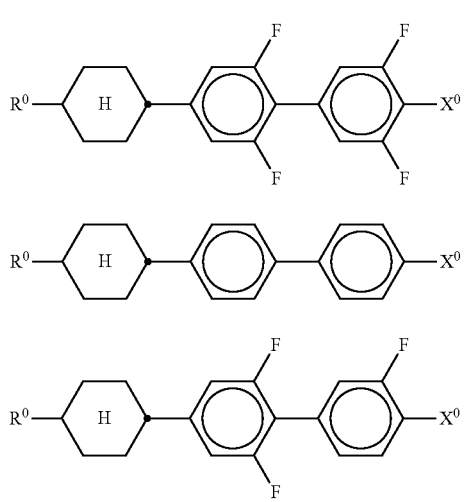

in which R⁰ and X⁰ have the meanings indicated above. Preferably, R⁰ in formula V denotes alkyl having 1 to 8 C atoms and X⁰ denotes F;

The medium comprises one or more compounds of the formula VI-1

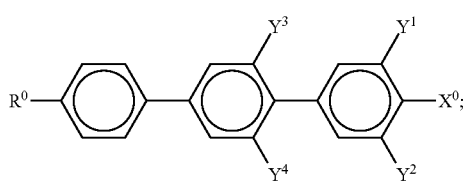

particularly preferably those selected from the following formulae:

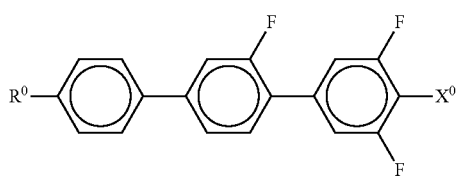

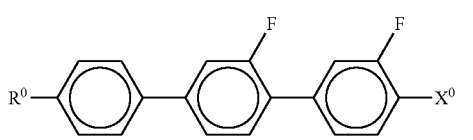

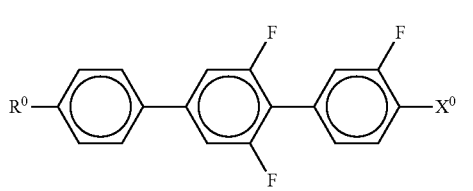

VI-1d

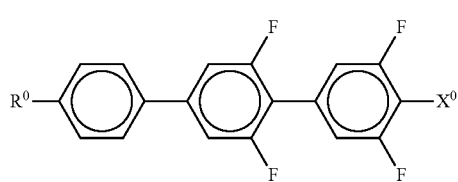

in which R⁰ and X⁰ have the meanings indicated above. Preferably, R⁰ in formula VI denotes alkyl having 1 to 8 C atoms and X⁰ denotes F, furthermore OCF₃.

The medium comprises one or more compounds of the formula VI-2

VI-2

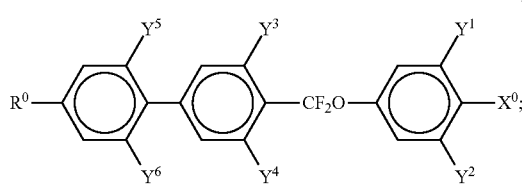

particularly preferably those selected from the following formulae:

VI-2a

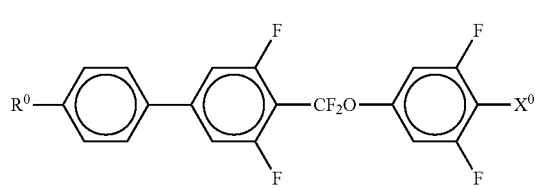

VI-2b

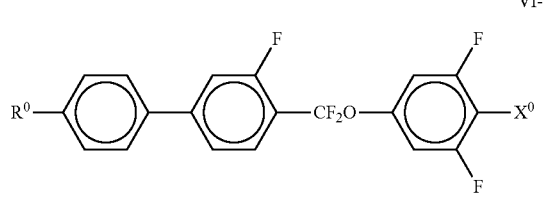

VI-2c

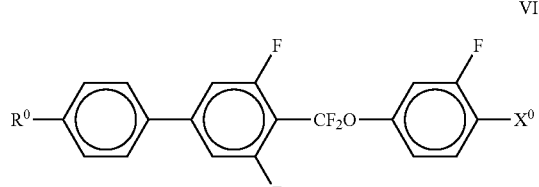

VI-2d

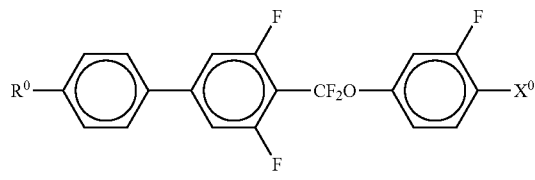

VI-2e

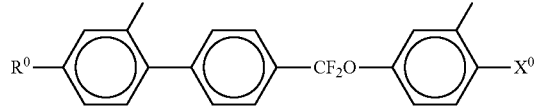

VI-2f

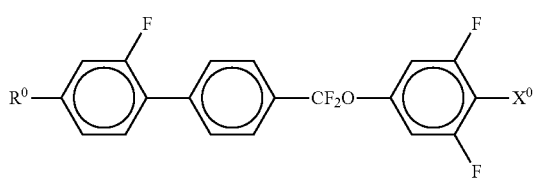

in which R⁰ and X⁰ have the meanings indicated above. Preferably, R⁰ in formula VI denotes alkyl having 1 to 8 C atoms and X⁰ denotes F;

The medium preferably comprises one or more compounds of the formula VII in which Z⁰ denotes —CF₂O—, —CH₂CH₂— or —COO—, particularly preferably those selected from the following formulae:

VII-1a

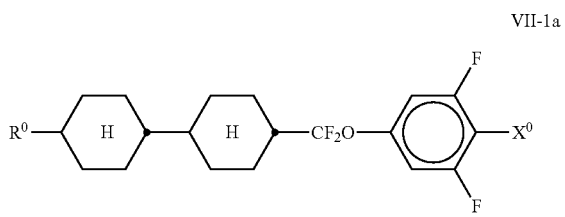

VII-1b

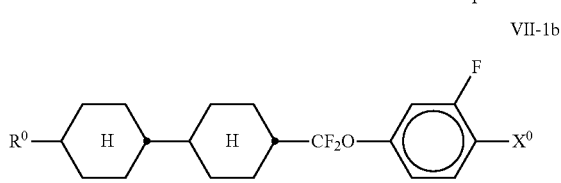

VII-1c

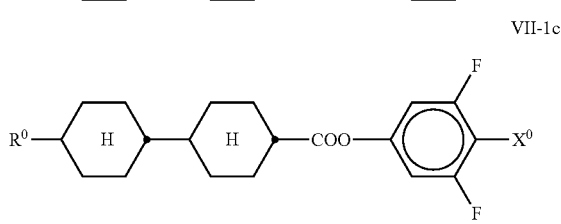

VII-1d

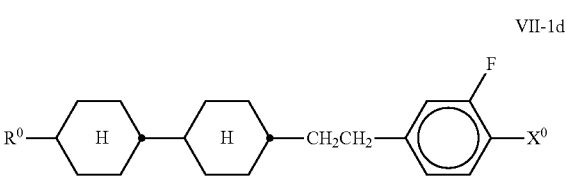

VII-1e

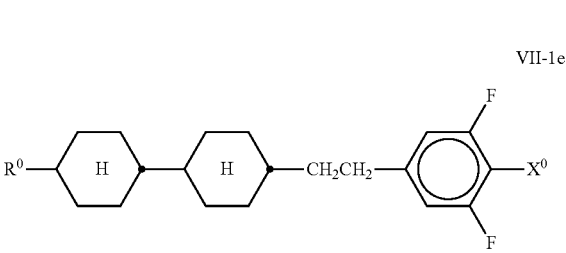

in which R⁰ and X⁰ have the meanings indicated above. Preferably, R⁰ in formula VII denotes alkyl having 1 to 8 C atoms and X⁰ denotes F, furthermore OCF₃.

The compounds of the formula VIII are preferably selected from the following formulae:

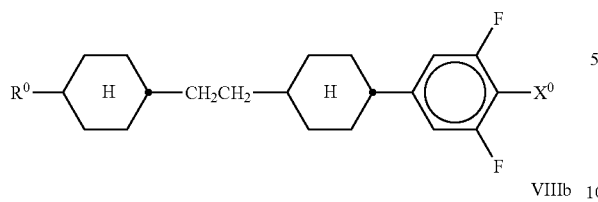
VIIIa

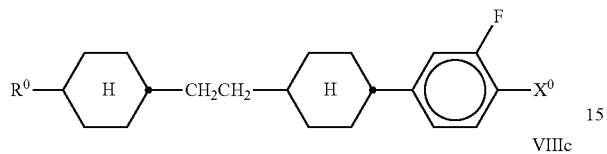
VIIIb

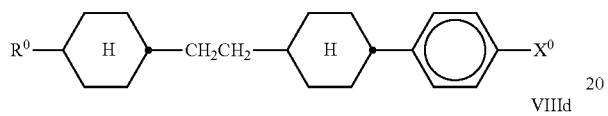
VIIIc

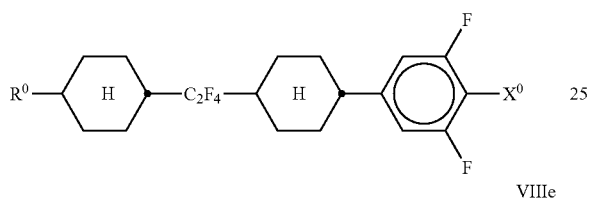
VIIId

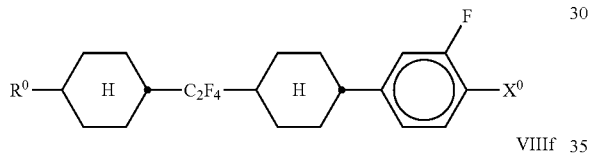
VIIIe

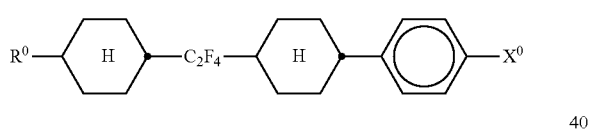
VIIIf in which $R^0$ and $X^0$ have the meanings indicated above. $R^0$ preferably denotes a straight-chain alkyl radical having 1 to 8 C atoms. $X^0$ preferably denotes F.

The medium additionally comprises one or more compounds of the following formula:

IX

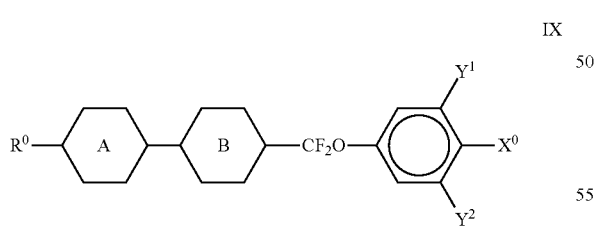

in which $R^0$, $X^0$, $Y^1$ and $Y^2$ have the meaning indicated above, and

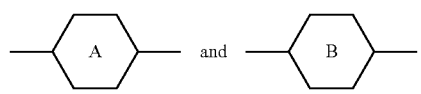

each, independently of one another, denote

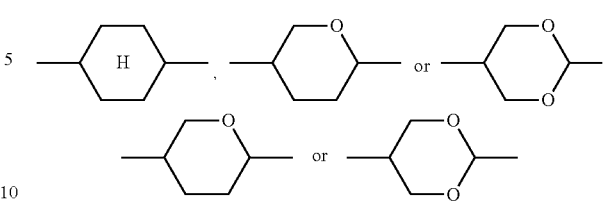

where rings A and B do not both simultaneously denote cyclohexylene;

The compounds of the formula IX are preferably selected from the following formulae:

IXa

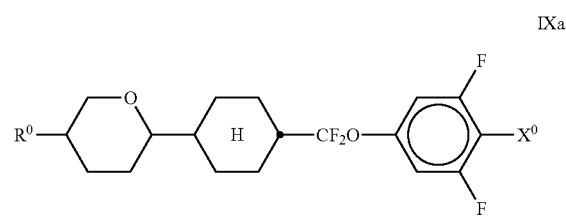

IXb

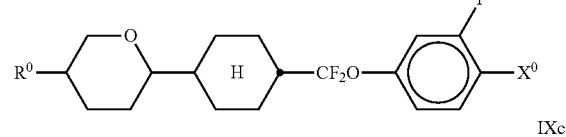

IXc

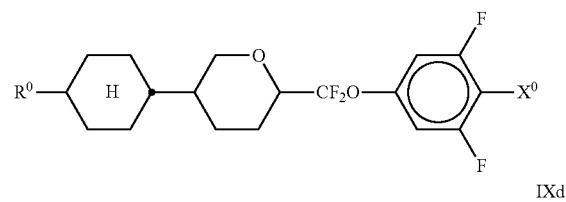

IXd

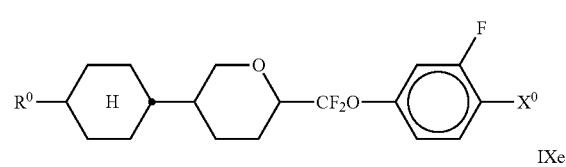

IXe

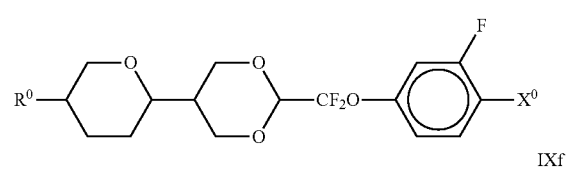

IXf

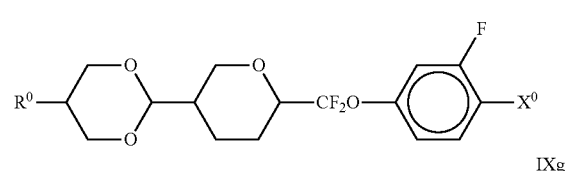

IXg

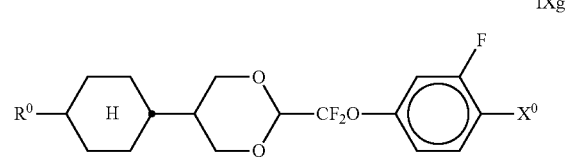

IXh

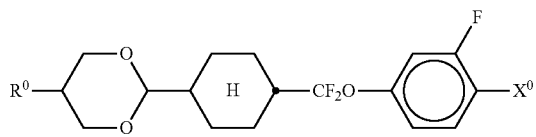

in which R⁰ and X⁰ have the meanings indicated above. Preferably, R⁰ denotes alkyl having 1 to 8 C atoms and X⁰ denotes F. Particular preference is given to compounds of the formula IXa;

The medium additionally comprises one or more compounds selected from the following formulae:

X

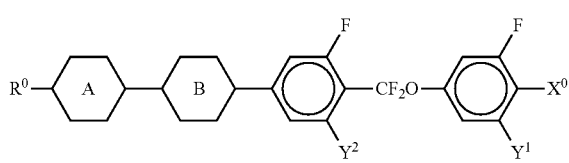

XI

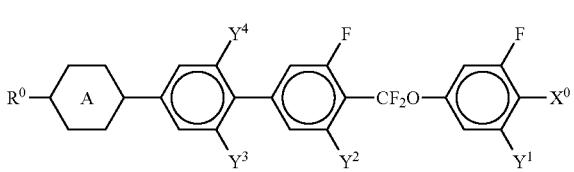

XII

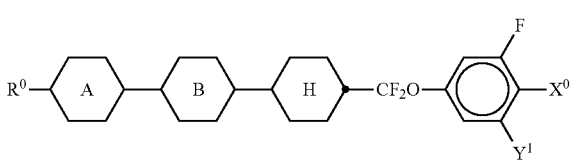

in which $R^0$, $X^0$ and $Y^{1-4}$ have the meaning indicated in formula I, and

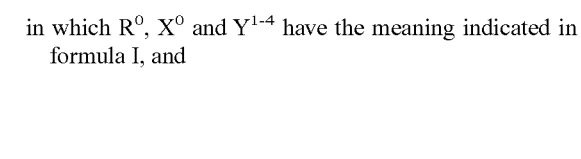

each, independently of one another, denote

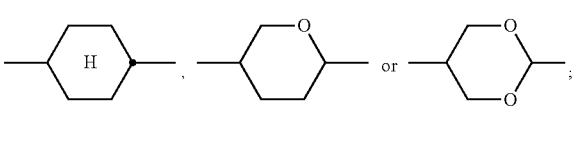

The compounds of the formulae X, XI and XII are preferably selected from the following formulae:

Xa

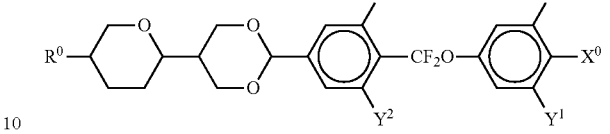

Xb

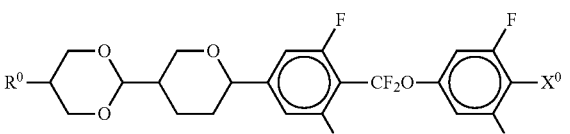

Xc

Xd

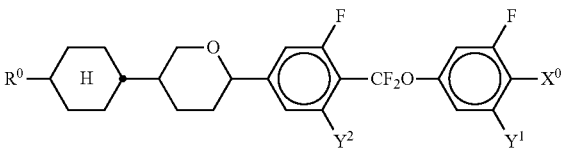

Xe

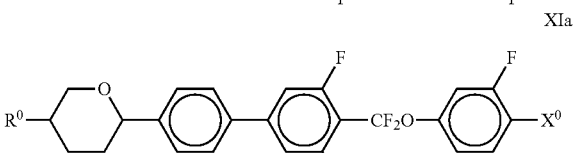

XIa

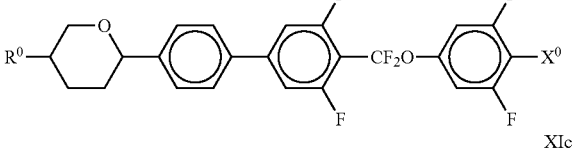

XIb

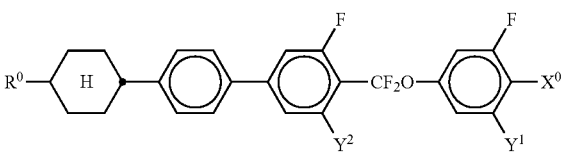

XIc

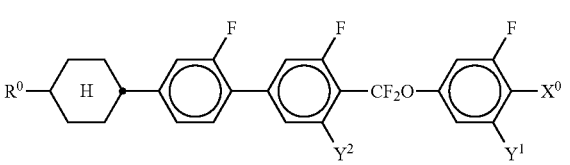

XId

-continued

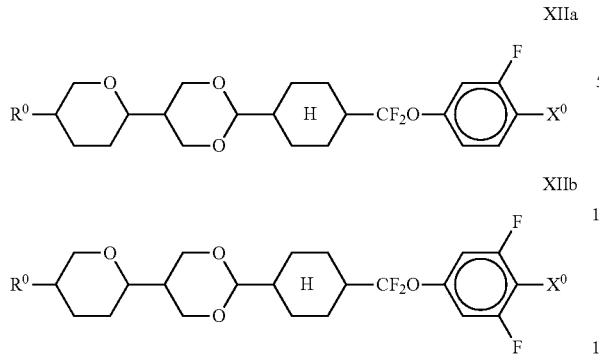

in which $R^0$ and $X^0$ have the meanings indicated above. Preferably, $R^0$ denotes alkyl having 1 to 8 C atoms and $X^0$ denotes F. Particularly preferred compounds are those in which $Y^1$ denotes F and $Y^2$ denotes H or F, preferably F. Particular preference is given to media comprising one or more compounds of the formula XIb in which $X^0$=F.

The medium additionally comprises one or more compounds of the following formula:

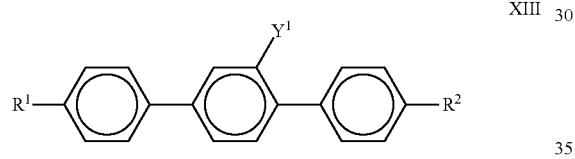

in which $R^1$ and $R^2$ each, independently of one another, denote n-alkyl, alkoxy, oxaalkyl, fluoroalkyl or alkenyl, each having up to 9 C atoms, and preferably each, independently of one another, denote alkyl having 1 to 8 C atoms. $Y^1$ denotes H or F.

Preferred compounds of the formula XIII are the compounds of the formulae

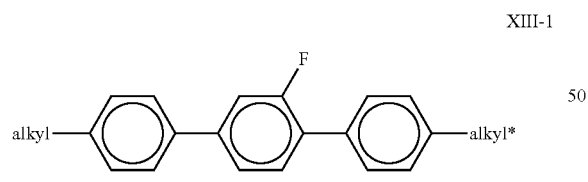

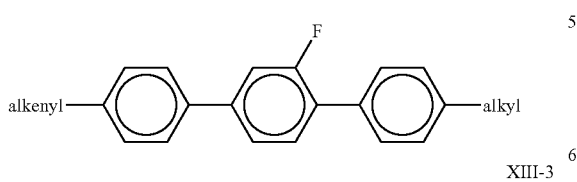

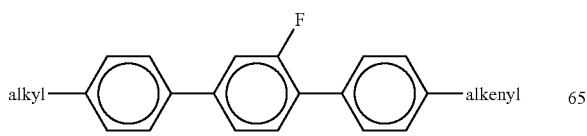

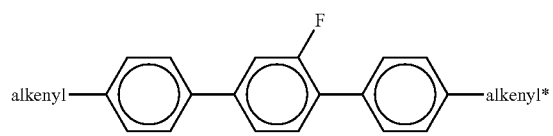

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Particular preference is given to media comprising one or more compounds of the formulae XIII-1 and/or XIII-3.

The medium additionally comprises one or more compounds selected from the following formulae:

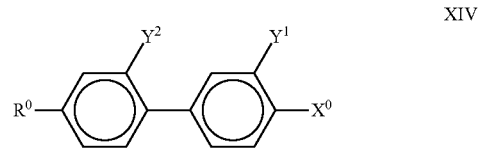

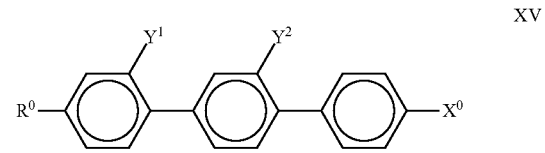

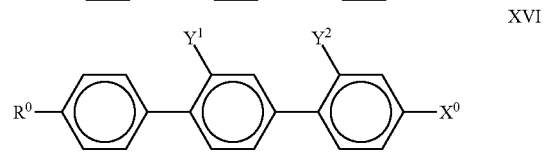

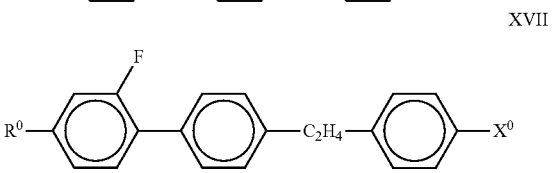

in which $R^0$, $X^0$, $Y^1$ and $Y^2$ have the meanings indicated above. Preferably, $R^0$ denotes alkyl having 1 to 8 C atoms and $X^0$ denotes F or Cl;

The compounds of the formulae XIV, XV and XVI are preferably selected from compounds of the formulae

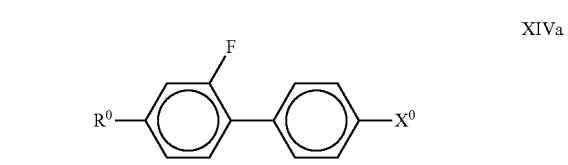

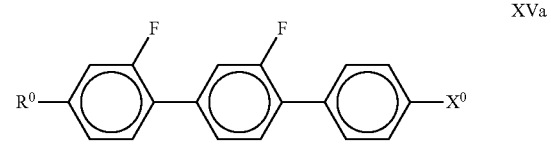

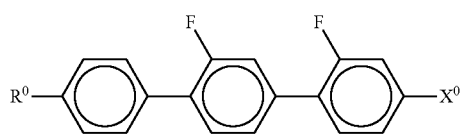

XVIa in which R⁰ and X⁰ have the meanings indicated above. R⁰ preferably denotes alkyl having 1 to 8 C atoms. In the compounds of the formula XIV, X⁰ preferably denotes F or Cl.

The medium additionally comprises one or more compounds of the following formulae D1 and/or D2:

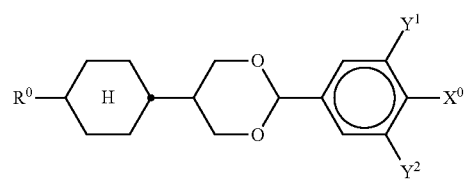

D1

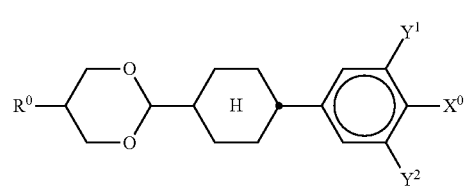

D2 in which $Y^1$, $Y^2$, $R^0$ and $X^0$ have the meaning indicated above. Preferably, $R^0$ denotes alkyl having 1 to 8 C atoms and $X^0$ denotes F. Particular preference is given to compounds of the formulae

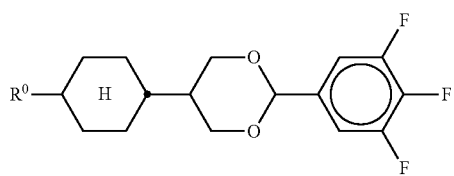

D1-1

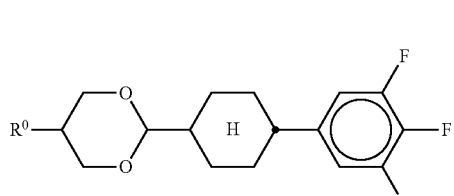

D2-1 in which $R^0$ has the meanings indicated above and, preferably denotes straight-chain alkyl having 1 to 6 C atoms, in particular $C_2H_5$, n-$C_3H_7$ or n-$C_5H_{11}$.

The medium additionally comprises one or more compounds of the following formula:

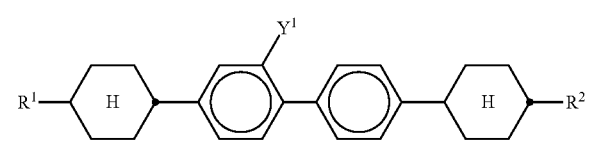

XVIII in which $Y^1$, $R^1$ and $R^2$ have the meaning indicated above. $R^1$ and $R^2$ preferably each, independently of one another, denote alkyl having 1 to 8 C atoms;

The medium additionally comprises one or more compounds of the following formula:

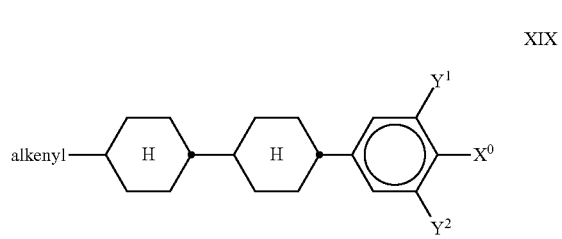

XIX in which $X^0$, $Y^1$ and $Y^2$ have the meanings indicated above, and "alkenyl" denotes $C_{2-7}$-alkenyl. Particular preference is given to compounds of the following formula:

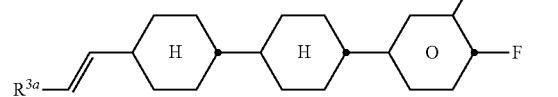

XIXa in which $R^{3a}$ has the meaning indicated above and preferably denotes H;

The medium additionally comprises one or more tetracyclic compounds selected from the formulae XX to XXVI:

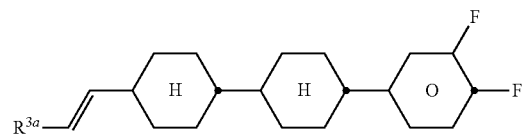

XX

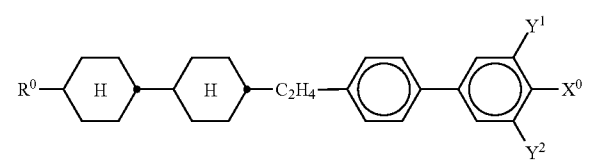

XXI

-continued

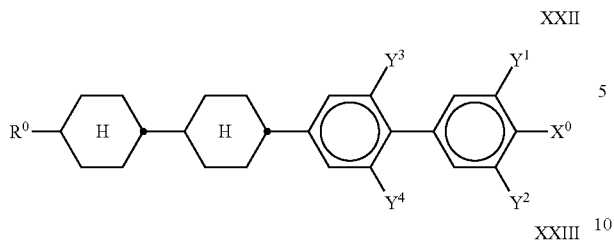
XXII

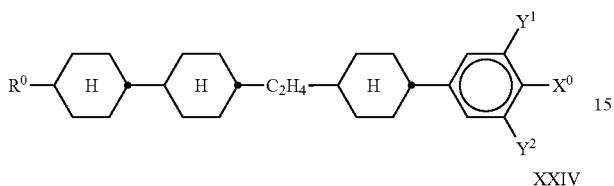
XXIII

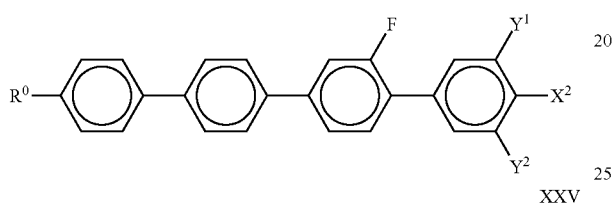
XXIV

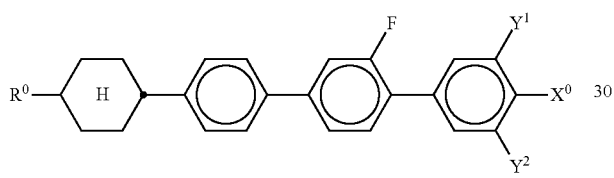
XXV

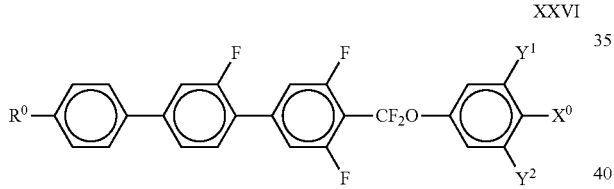
XXVI in which $Y^{1-4}$, $R^0$ and $X^0$ each, independently of one another, have one of the meanings indicated above. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

Preferred media comprise one or more compounds of the formula

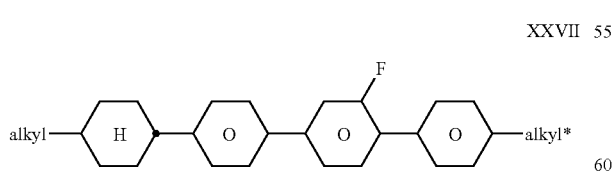
XXVII in which alkyl and alkyl* each, independently of one another, denote a straight-chain alkyl radical having 1 to 6 C atoms.

Particular preference is given to compounds of the formulae

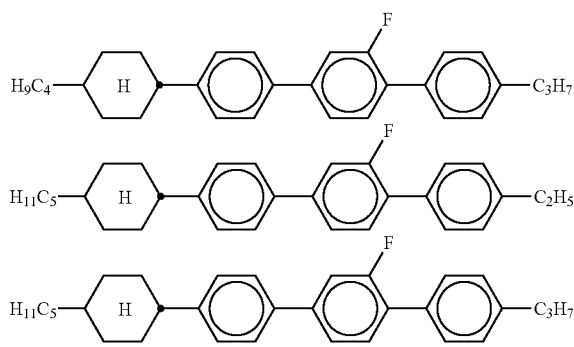

The compound of the formula XXVII is preferably employed in amounts of 0.5-30% by weight, in particular 3-25% by weight.

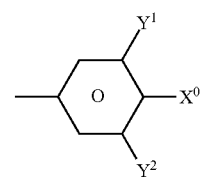

is preferably

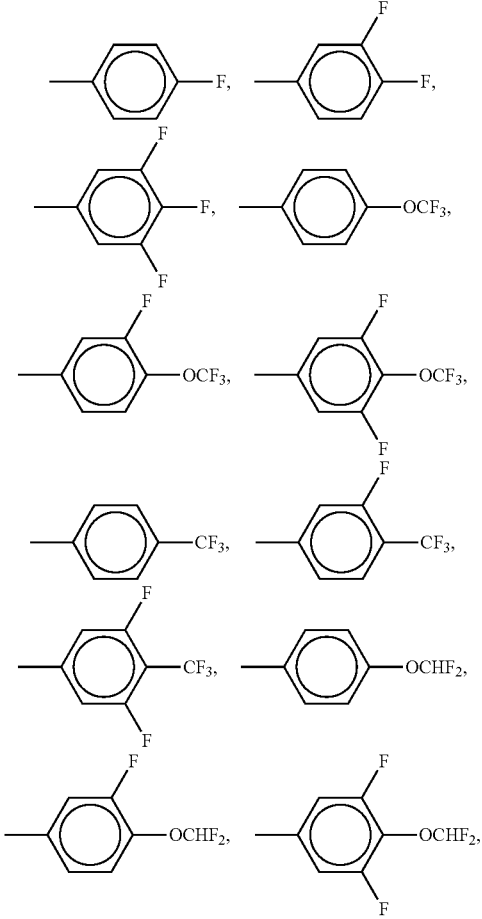

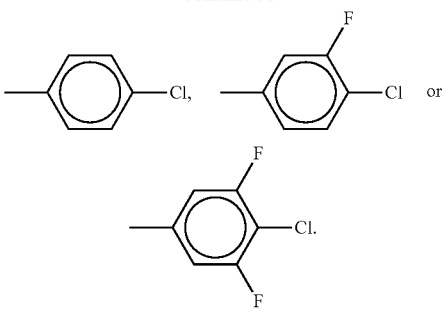

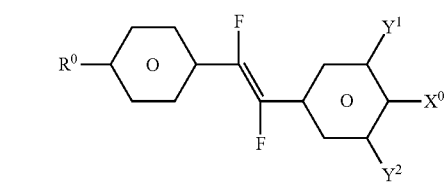

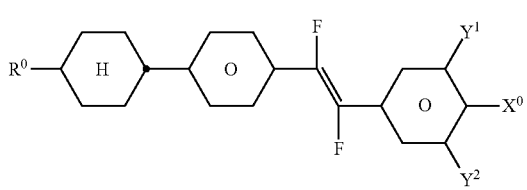

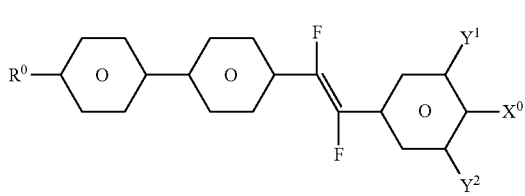

$R^0$ is preferably straight-chain alkyl or alkenyl having 2 to 7 C atoms;

$X^0$ is preferably F, furthermore $OCF_3$, Cl or $CF_3$;

The medium preferably comprises one, two or three compounds of the formula I;

The medium preferably comprises one or more compounds selected from the group of the compounds of the formulae I, II, III, V, VI-1, VI-2, XIII, XIV, XV, XVIII, XXIV, XXVI, XXVII;

The medium preferably comprises one or more compounds of the formula VI-1;

The medium preferably comprises one or more compounds of the formula VI-2;

The medium preferably comprises 1-25% by weight, preferably 2-20% by weight, particularly preferably 2-15% by weight, of compounds of the formula I;

The proportion of compounds of the formulae II-XXVII in the mixture as a whole is preferably 20 to 99% by weight;

The medium preferably comprises 25-80% by weight, particularly preferably 30-70% by weight, of compounds of the formulae II and/or III;

The medium preferably comprises 5-40% by weight, particularly preferably 10-30% by weight, of compounds of the formula V;

The medium preferably comprises 3-30% by weight, particularly preferably 6-25% by weight, of compounds of the formula VI-1;

The medium preferably comprises 2-30% by weight, particularly preferably 4-25% by weight, of compounds of the formula VI-2;

The medium comprises 5-40% by weight, particularly preferably 10-30% by weight, of compounds of the formula XIII;

The medium preferably comprises 1-25% by weight, particularly preferably 2-15% by weight, of compounds of the formula XIV;

The medium preferably comprises 5-45% by weight, particularly preferably 10-35% by weight, of compounds of the formula XV;

The medium preferably comprises 1-20% by weight, particularly preferably 2-15% by weight, of compounds of the formula XVII;

The medium additionally comprises one or more compounds of the formulae St-1 to St-3:

in which $R^0$, $Y^1$, $Y^2$ and $X^0$ have the meanings indicated above. $R^0$ preferably denotes straight-chain alkyl, preferably having 1-6 C atoms. $X^0$ is preferably F or $OCF_3$. $Y^1$ preferably denotes F. $Y^2$ preferably denotes F. Preference is furthermore given to compounds in which $Y^1$=F and $Y^2$=H. The compounds of the formulae St-1 to St-3 are preferably employed in the mixtures according to the invention in concentrations of 3-30% by weight, in particular 5-25% by weight.

The medium additionally comprises one or more pyrimidine compounds of the formula

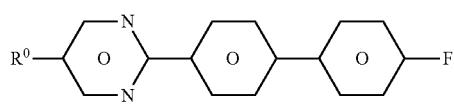

in which $R^0$ is preferably straight-chain alkyl having 2-5 C atoms. Preferred mixtures comprise 3-30% by weight, in particular 5-20% by weight, of this (these) pyrimidine compound(s).

Particularly preferred media comprise one or more compounds of the formulae

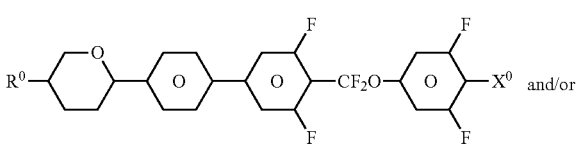

and/or

XXVI

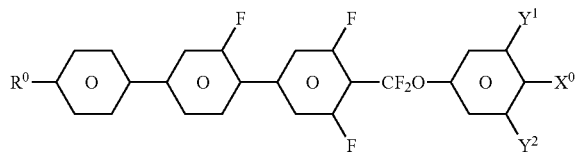

in which $Y^1$ and $Y^2$ preferably both denote fluorine; $X^0$ preferably denotes fluorine, furthermore $OCF_3$. $R^0$ in the compounds XIb and XXV is preferably a straight-chain alkyl radical having 1-6 C atoms, in particular 2-5 C atoms.

Preferred media comprise at least one compound of the formula I, at least one compound of the formula XIb, at least one compound of the formula XXVI and in addition at least one compound of the formula

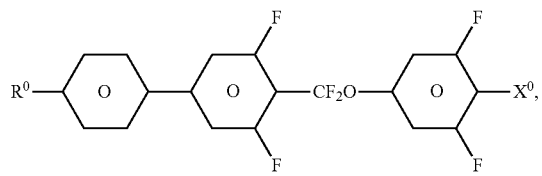

in which preferably $X^0$ denotes fluorine, furthermore $OCF_3$, and $R^0$ denotes a straight-chain alkyl radical having 1-6 C atoms, in particular 2-5 C atoms.

It has been found that even a relatively small proportion of compounds of the formula I mixed with conventional liquid-crystal materials, but in particular with one or more compounds of the formulae II to XXVII, results in a significant increase in the light stability and in low birefringence values, with broad nematic phases with low smectic-nematic transition temperatures being observed at the same time, improving the shelf life. At the same time, the mixtures exhibit very low threshold voltages and very good values for the VHR on exposure to UV.

The term "alkyl" or "alkyl*" in this application encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl'" in this application encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_5$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" in this application encompasses straight-chain groups having at least one fluorine atom, preferably a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" in this application encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $K_1$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae IV to VIII in which $X^0$ denotes F, $OCF_3$, $OCHF_2$, $OCH=CF_2$, $OCF=CF_2$ or $OCF_2-CF_2H$. A favourable synergistic action with the compounds of the formula I results in particularly advantageous properties. In particular, mixtures comprising compounds of the formulae I, VI and XI are distinguished by their low threshold voltages.

The individual compounds of the above-mentioned formulae and the subformulae thereof which can be used in the media according to the invention are either known or can be prepared analogously to the known compounds.

The invention also relates to electro-optical displays, such as, for example, TN, STN, FFS, OCB, IPS, TN-TFT or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous, materials from the prior art.

The mixtures according to the invention are particularly suitable for mobile applications and high-$\Delta n$ TFT applications, such as, for example, PDAs, notebooks, LCD TVs and monitors.

The liquid-crystal mixtures according to the invention, while retaining the nematic phase down to −20° C. and preferably down to −30° C., particularly preferably down to −40° C., and the clearing point ≥70° C., preferably ≥75° C., at the same time allow rotational viscosities $\gamma_1$ of ≤120 mPa·s, particularly preferably 100 mPa·s, to be achieved, enabling excellent MLC displays having fast response times to be achieved.

The dielectric anisotropy $\Delta\varepsilon$ of the liquid-crystal mixtures according to the invention is preferably ≥+5, particularly preferably ≥+10. In addition, the mixtures are characterised by low operating voltages. The threshold voltage of the liquid-crystal mixtures according to the invention is preferably ≤1.5 V, in particular ≤1.2 V.

The birefringence $\Delta n$ of the liquid-crystal mixtures according to the invention is preferably ≥0.10, particularly preferably ≥0.11.

The nematic phase range of the liquid-crystal mixtures according to the invention preferably has a width of at least 90°, in particular at least 100°. This range preferably extends at least from −25° C. to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having a higher $\Delta\varepsilon$ and thus low thresholds. The MLC displays according to the invention preferably operate at the first Gooch and Tarry transmission minimum [C. H. Gooch and H. A. Tarry, Electron. Lett 10, 2-4, 1974; C. H. Gooch and N. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on UV exposure than analogous mixtures comprising cyanophenylcyclohexanes of the formula

or esters of the formula

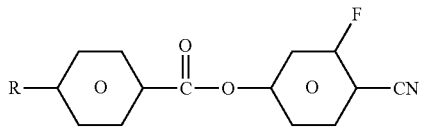

instead of the compounds of the formula I.

The light stability and UV stability of the mixtures according to the invention are considerably better, i.e. they exhibit a significantly smaller decrease in the HR on exposure to light or UV. Even low concentrations of the compounds (<10% by weight) of the formula I in the mixtures increase the HR by 6% or more compared with mixtures from the prior art.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formula I with one or more compounds of the formulae II-XXVII or with further liquid-crystalline compounds and/or additives. In general, the desired amount of the components used in the smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes or chiral dopants can be added. Suitable stabilisers and dopants are mentioned below in Tables C and D.

In the present application and in the examples below, the structures of the liquid-crystal compounds are indicated by means of acronyms, the trans-formation into chemical formulae taking place in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident; In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for R$^{1*}$, R$^{2*}$, L$^{1*}$, L$^{2*}$, L$^{3*}$ | R$^{1*}$ | R$^{2*}$ | L$^{1*}$ | L$^{2*}$ |
|---|---|---|---|---|
| nm | C$_n$H$_{2n+1}$ | C$_m$H$_{2m+1}$ | H | H |
| nOm | C$_n$H$_{2n+1}$ | OC$_m$H$_{2m+1}$ | H | H |
| nO.m | OC$_n$H$_{2n+1}$ | C$_m$H$_{2m+1}$ | H | H |
| n | C$_n$H$_{2n+1}$ | CN | H | H |
| nN.F | C$_n$H$_{2n+1}$ | CN | F | H |
| nN.F.F | C$_n$H$_{2n+1}$ | CN | F | F |
| nF | C$_n$H$_{2n+1}$ | F | H | H |
| nCl | C$_n$H$_{2n+1}$ | Cl | H | H |
| nOF | OC$_n$H$_{2n+1}$ | F | H | H |
| nF.F | C$_n$H$_{2n+1}$ | F | F | H |
| nF.F.F | C$_n$H$_{2n+1}$ | F | F | F |
| nOCF$_3$ | C$_n$H$_{2n+1}$ | OCF$_3$ | H | H |
| nOCF$_3$.F | C$_n$H$_{2n+1}$ | OCF$_3$ | F | H |
| n-Vm | C$_n$H$_{2n+1}$ | —CH=CH—C$_m$H$_{2m+1}$ | H | H |
| nV-Vm | C$_n$H$_{2n+1}$—CH=CH— | —CH=CH—C$_m$H$_{2m+1}$ | H | H |

Preferred mixture components are shown in Tables A and B.

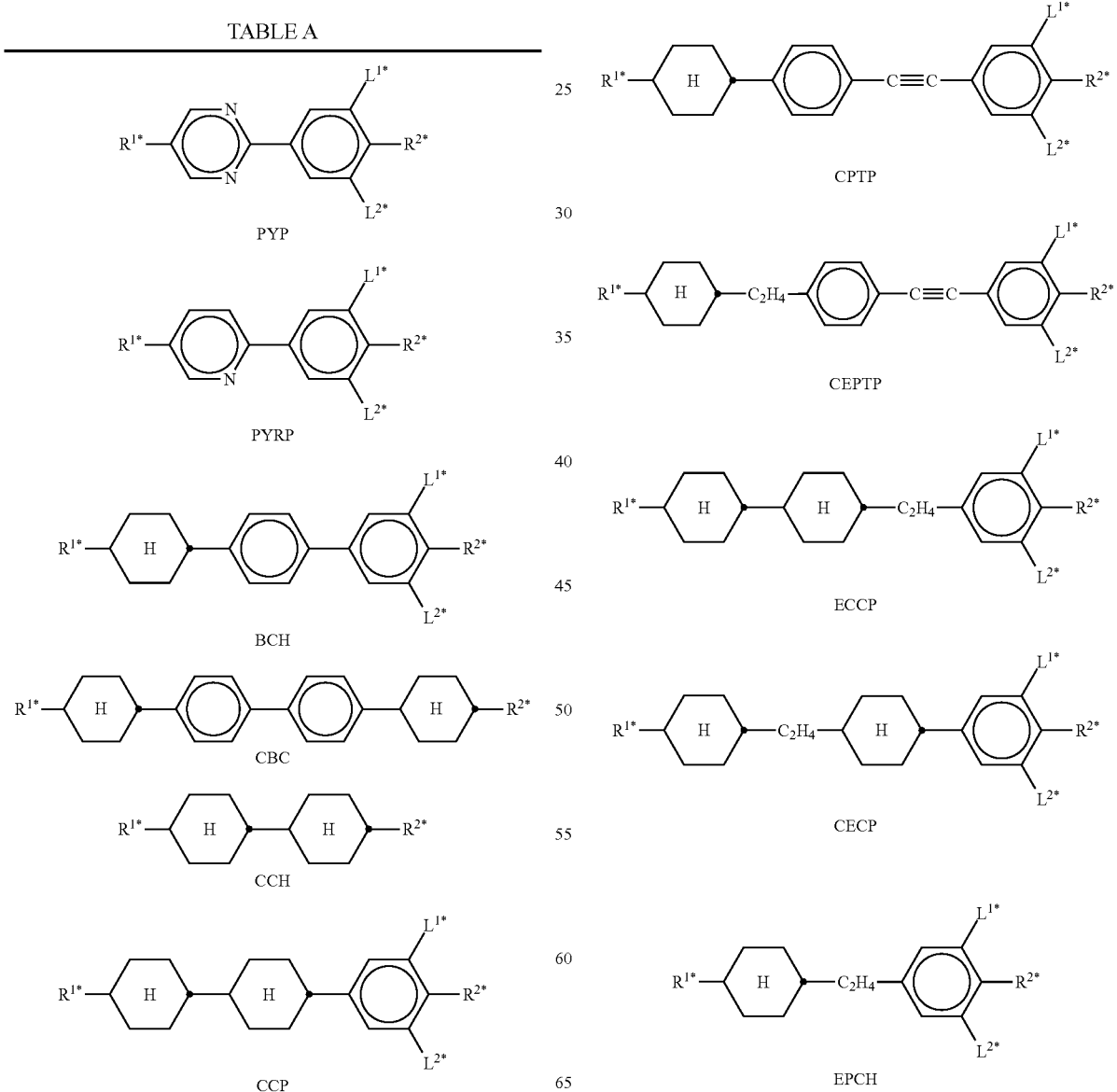

TABLE A

PYP

PYRP

BCH

CBC

CCH

CCP

TABLE A-continued

CPTP

CEPTP

ECCP

CECP

EPCH

TABLE A-continued
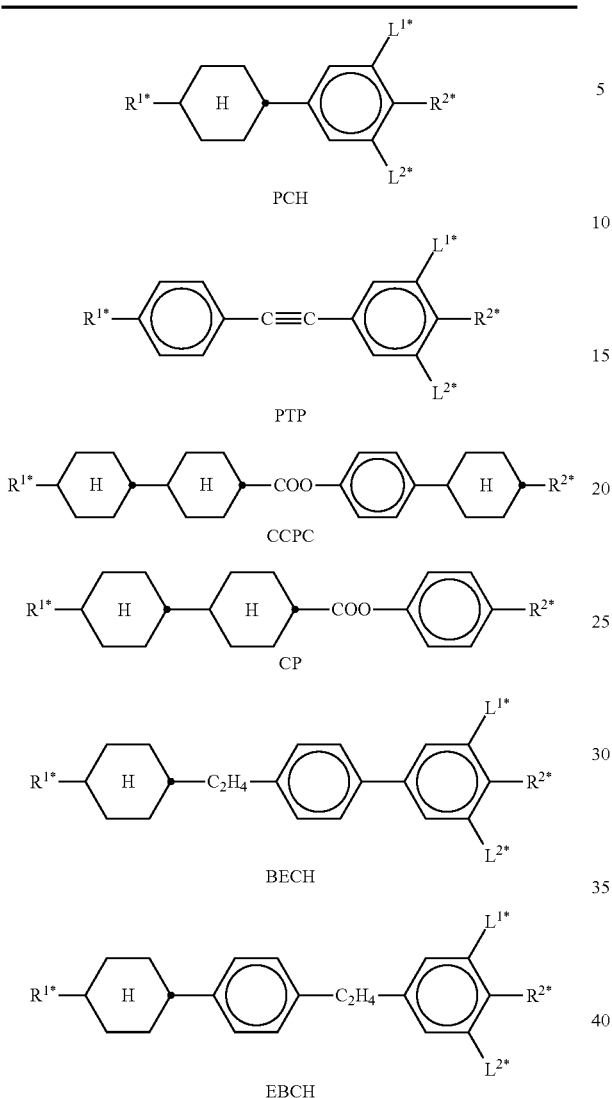
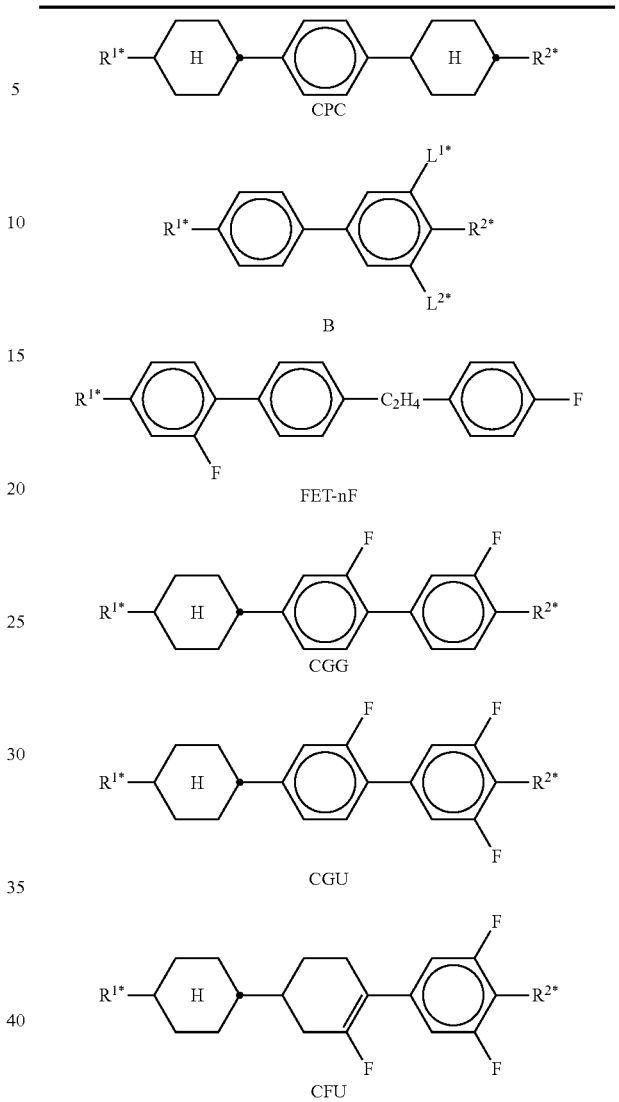
TABLE B
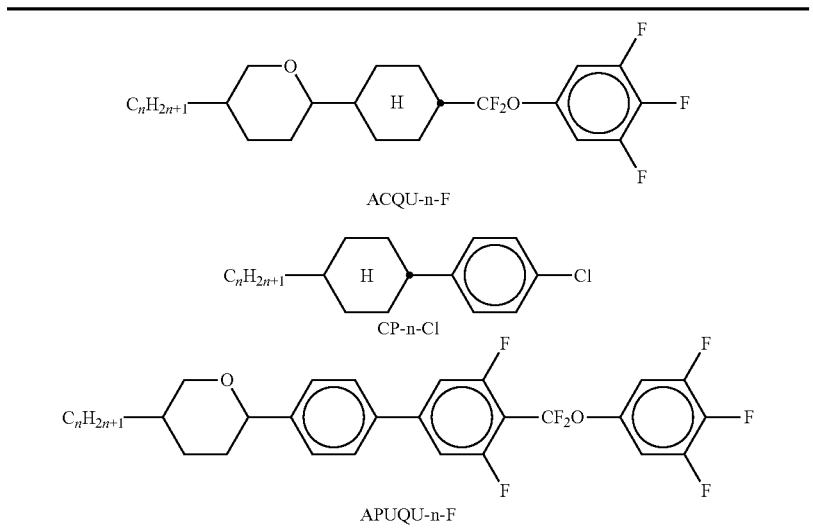

TABLE B-continued
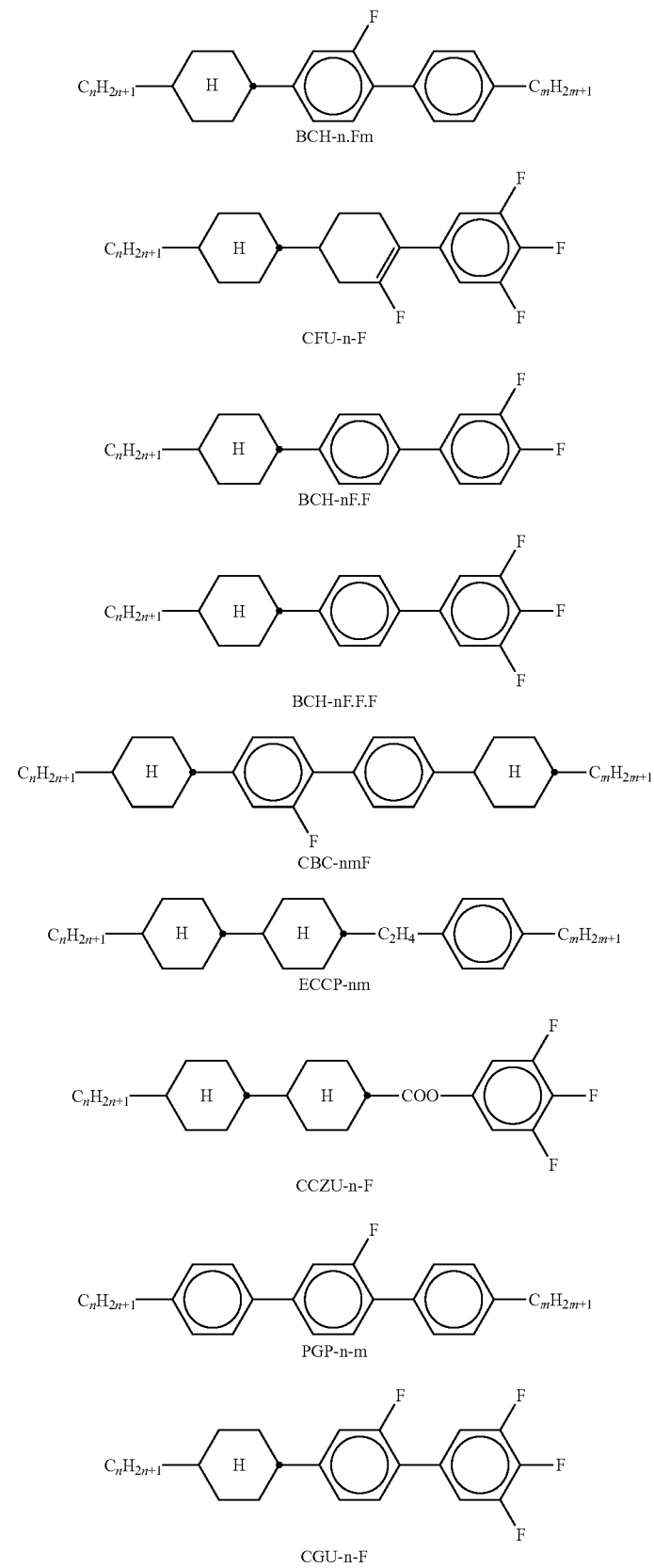

TABLE B-continued
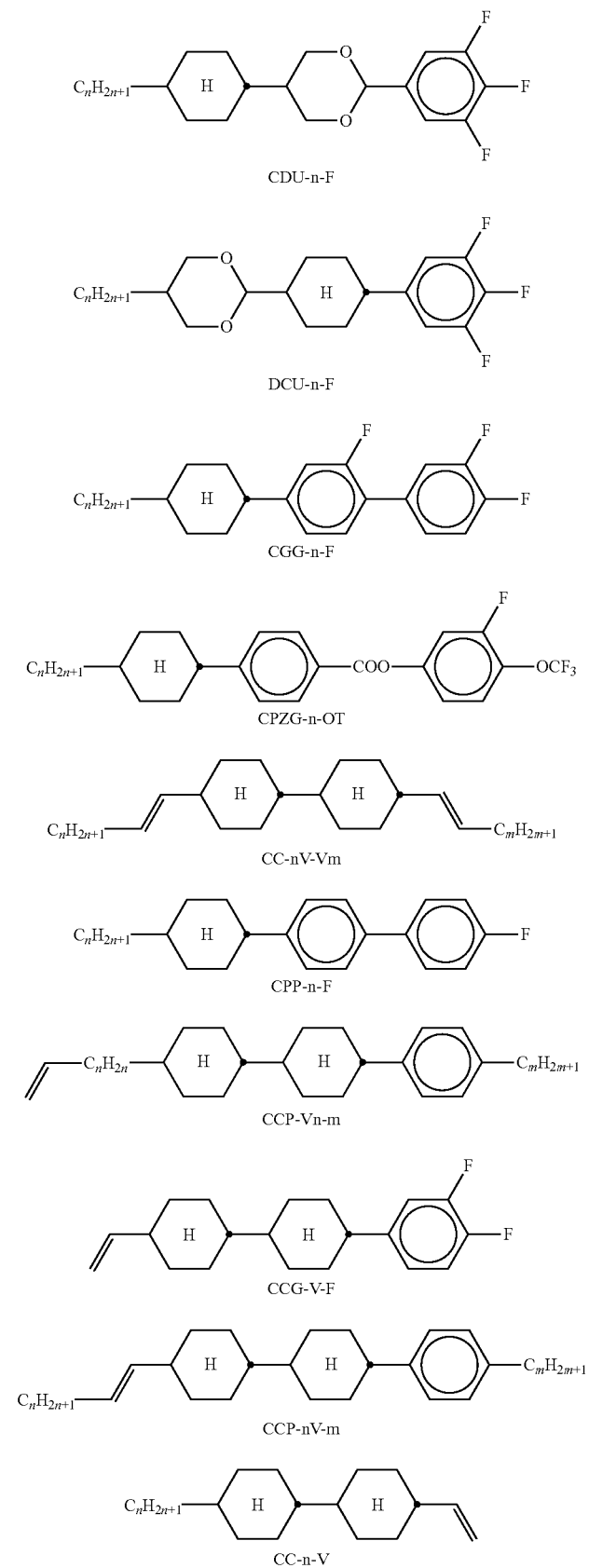

TABLE B-continued
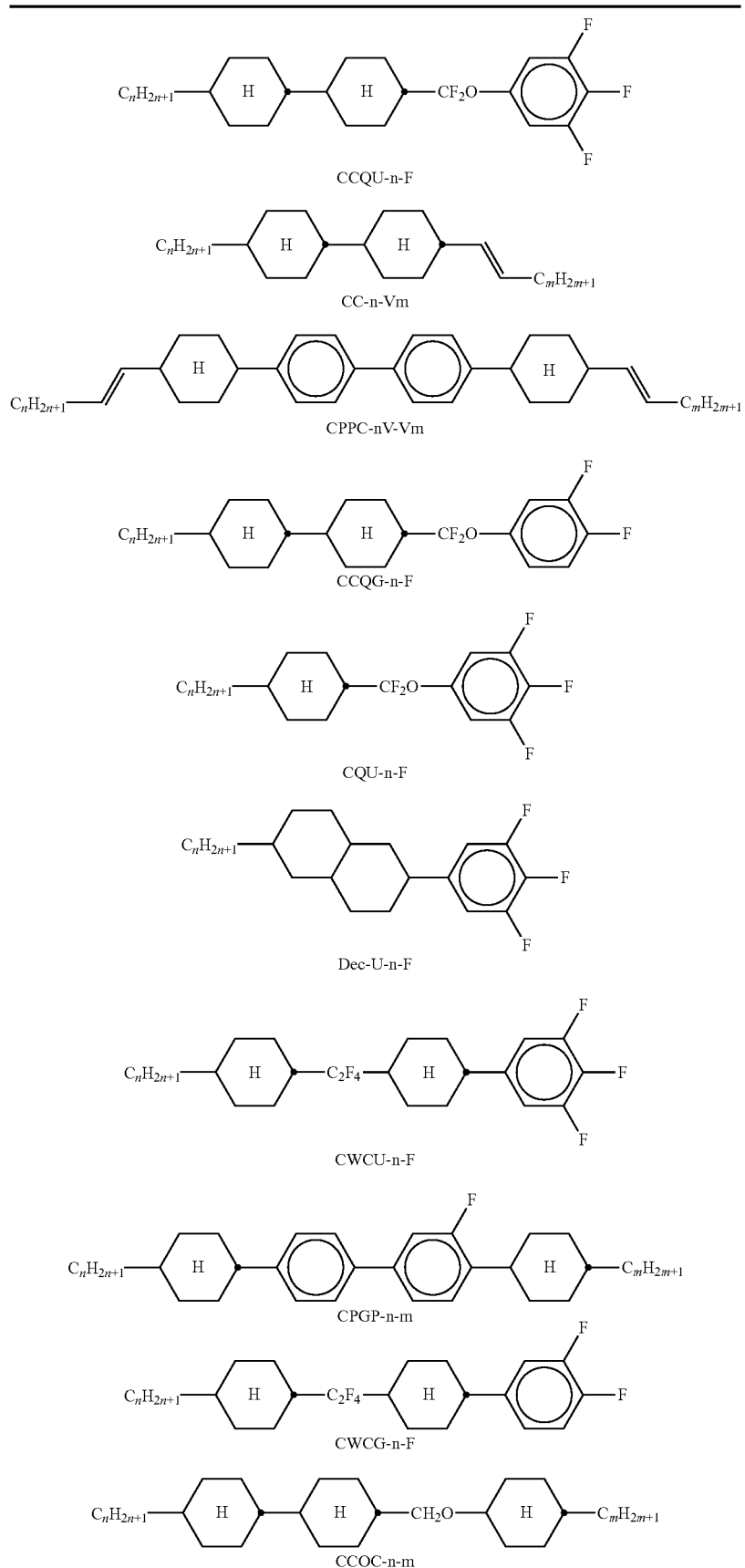

TABLE B-continued
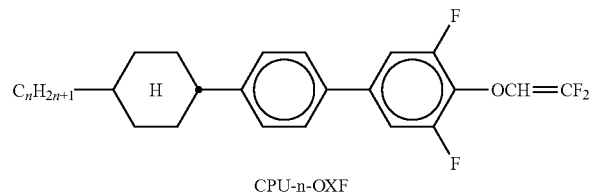
CPU-n-OXF
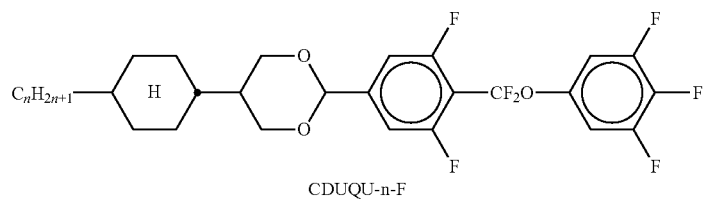
CDUQU-n-F
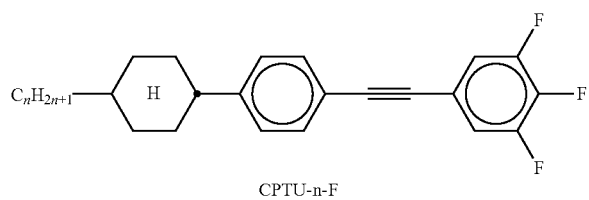
CPTU-n-F
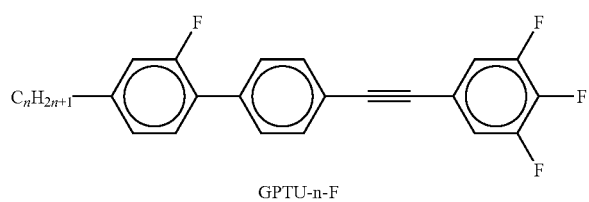
GPTU-n-F
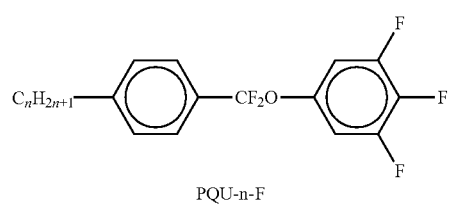
PQU-n-F
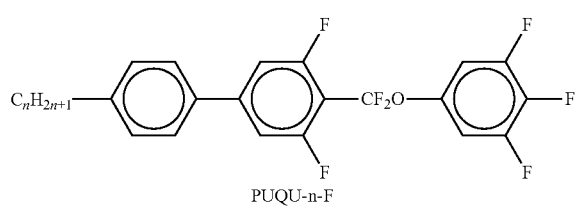
PUQU-n-F
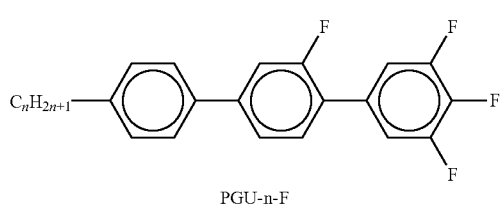
PGU-n-F
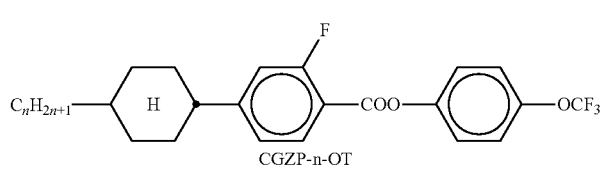
CGZP-n-OT TABLE B-continued
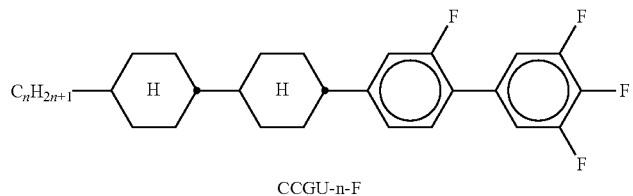
CCGU-n-F
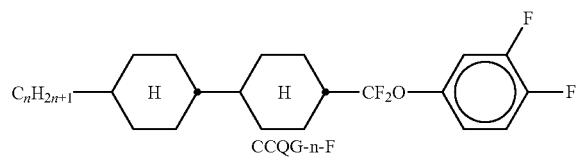
CCQG-n-F
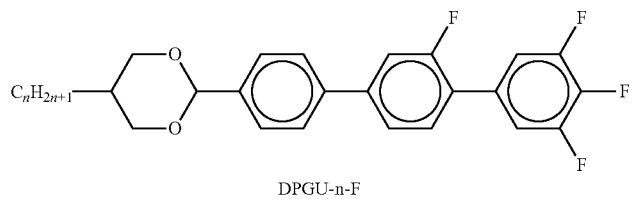
DPGU-n-F
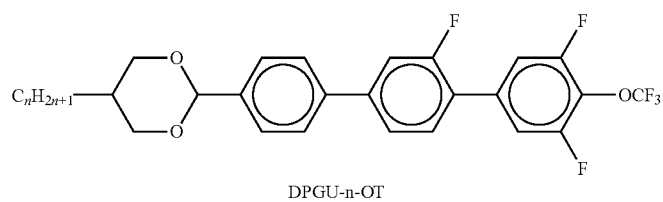
DPGU-n-OT
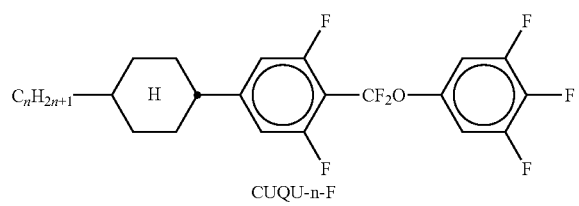
CUQU-n-F
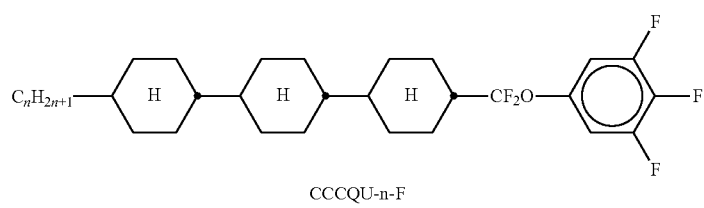
CCCQU-n-F
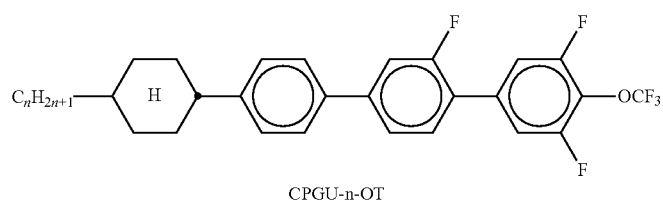
CPGU-n-OT
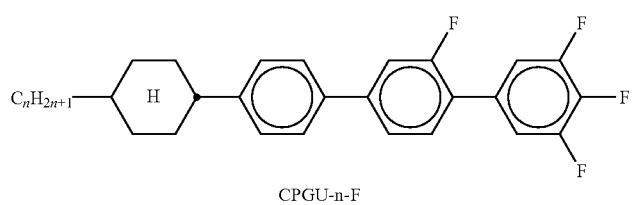
CPGU-n-F TABLE B-continued
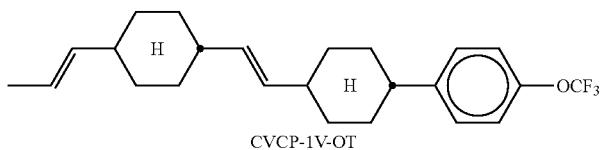
CVCP-1V-OT
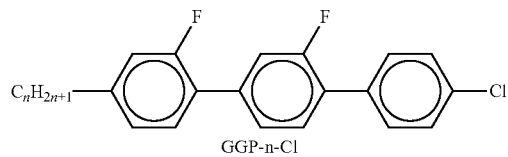
GGP-n-Cl
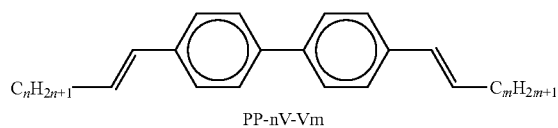
PP-nV-Vm
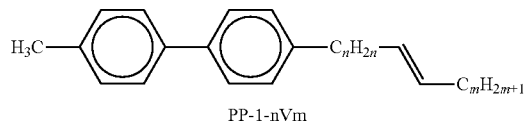
PP-1-nVm
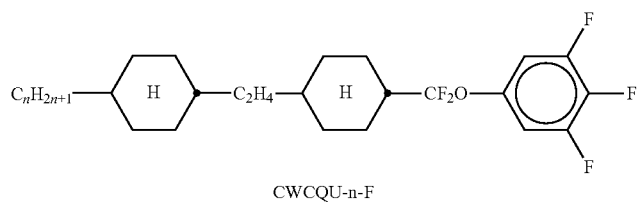
CWCQU-n-F
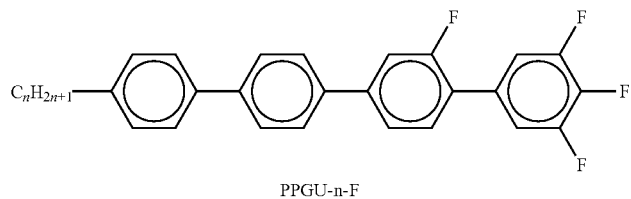
PPGU-n-F
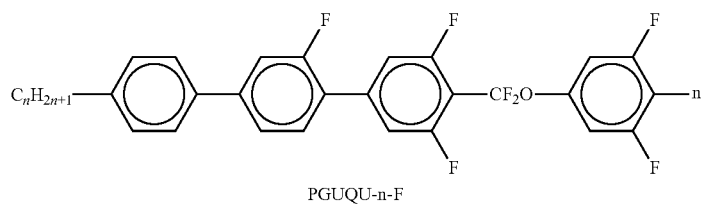
PGUQU-n-F
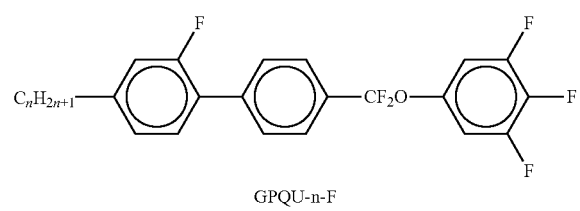
GPQU-n-F
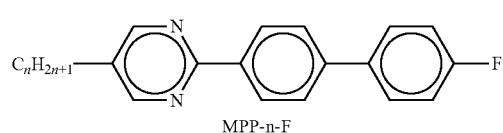
MPP-n-F TABLE B-continued

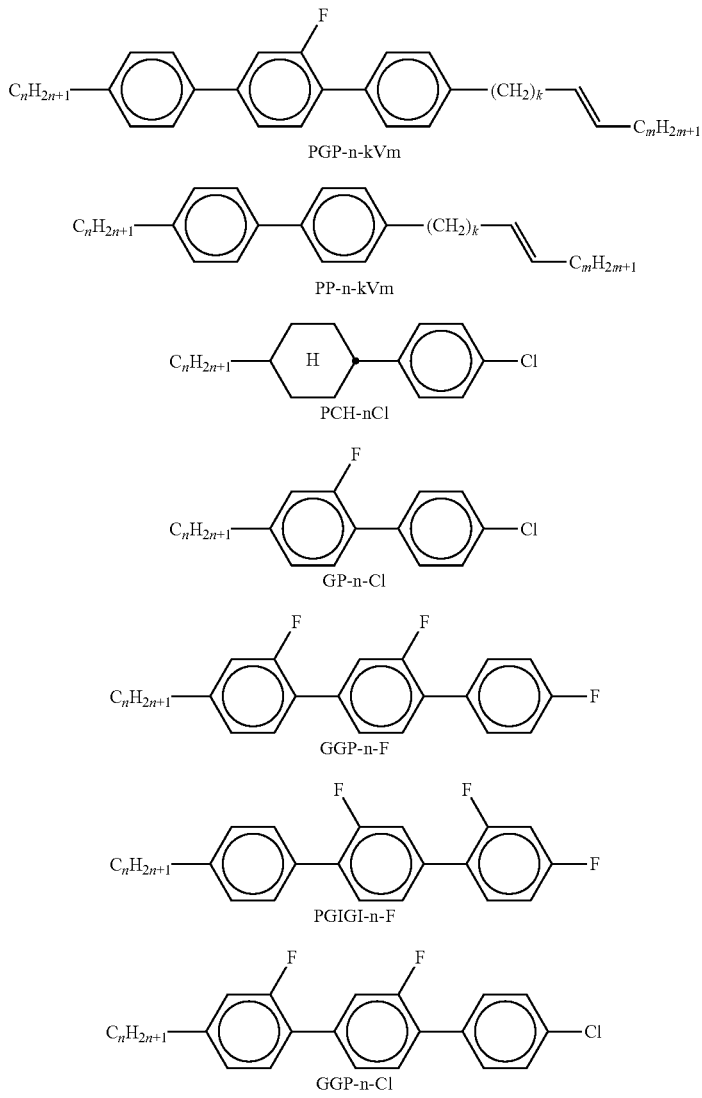

45
Particular preference is given to liquid-crystalline mixtures which, besides the compounds of the formula I, comprise at least one, two, three, four or more compounds from Table B.

TABLE C

Table C indicates possible dopants which are generally added to the mixtures according to the invention. The mixtures preferably comprise 0-10% by weight, in particular 0.01-5% by weight and particularly preferably 0.01-3% by weight of dopants.

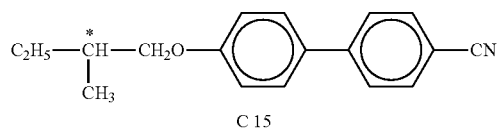

C 15

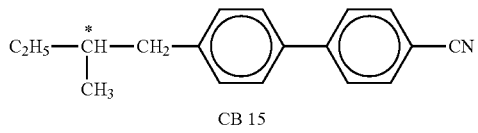

CB 15

TABLE C-continued
Table C indicates possible dopants which are generally added to the mixtures according to the invention. The mixtures preferably comprise 0-10% by weight, in particular 0.01-5% by weight and particularly preferably 0.01-3% by weight of dopants.
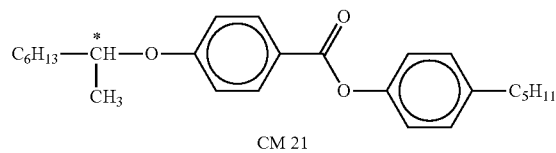
CM 21
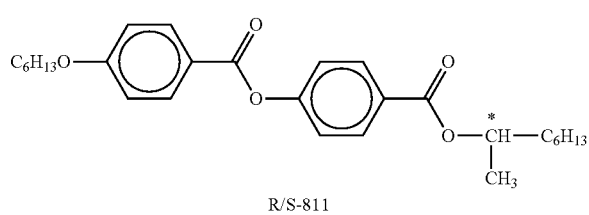
R/S-811
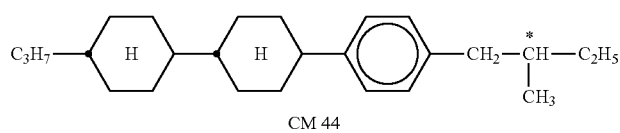
CM 44
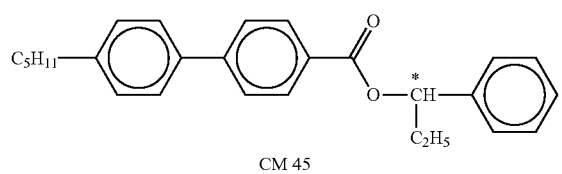
CM 45
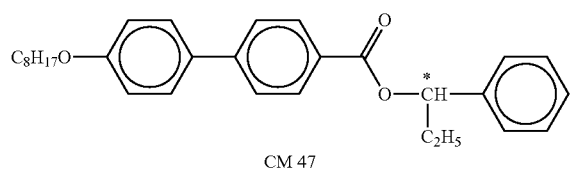
CM 47
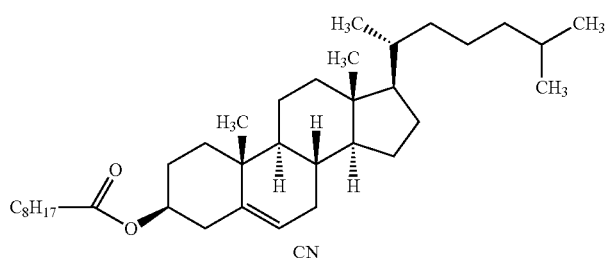
CN
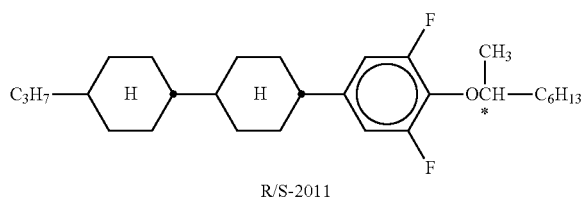
R/S-2011
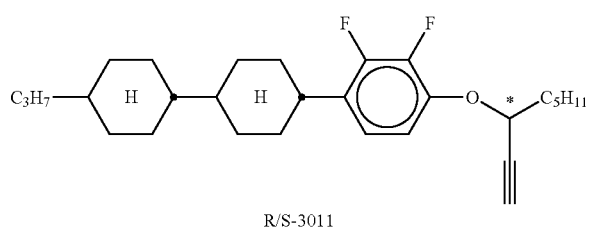
R/S-3011

TABLE C-continued

Table C indicates possible dopants which are generally added to the mixtures according to the invention. The mixtures preferably comprise 0-10% by weight, in particular 0.01-5% by weight and particularly preferably 0.01-3% by weight of dopants.

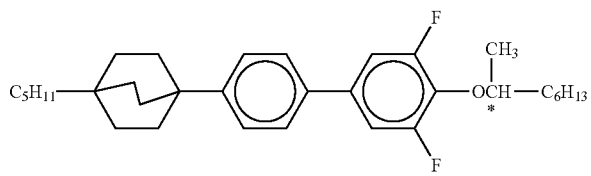

R/S-4011

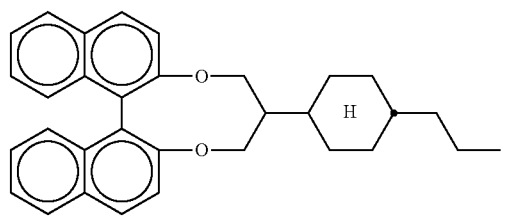

R/S-5011

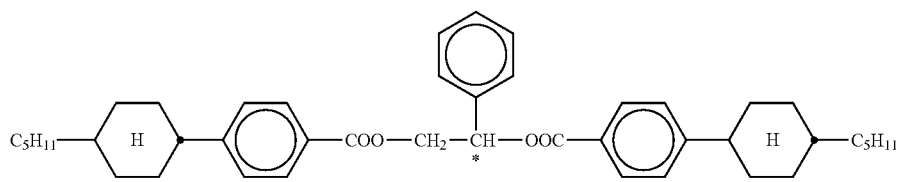

R/S-1011

TABLE D

Stabilisers which can be added, for example, to the mixtures according to the invention in amounts of 0-10% by weight are mentioned below.

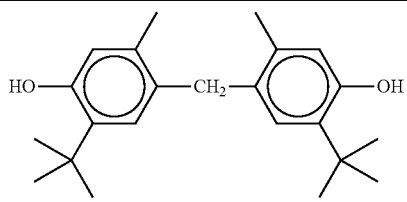

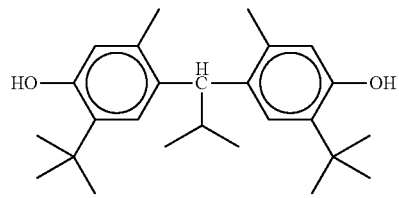

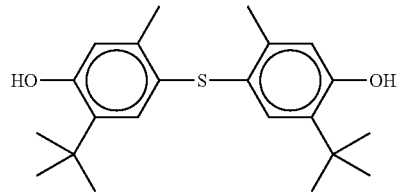

TABLE D-continued
Stabilisers which can be added, for example, to the mixtures according to the invention in amounts of 0-10% by weight are mentioned below.
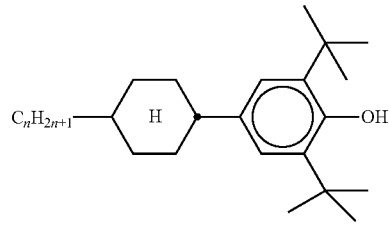
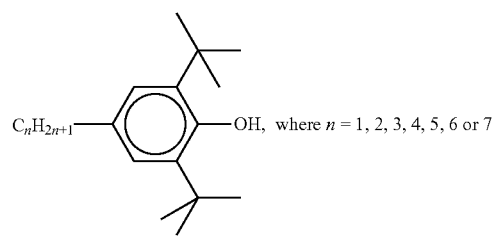
OH, where $n = 1, 2, 3, 4, 5, 6$ or $7$
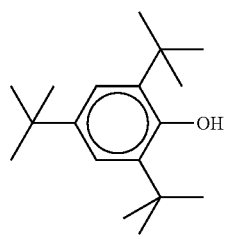
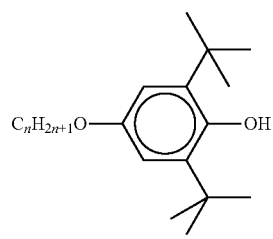
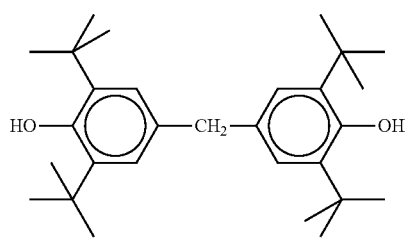
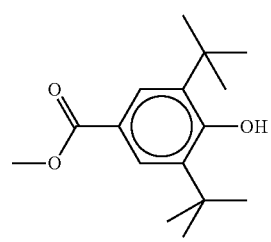

TABLE D-continued
Stabilisers which can be added, for example, to the mixtures according to the invention in amounts of 0-10% by weight are mentioned below.
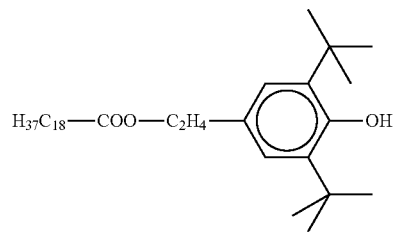
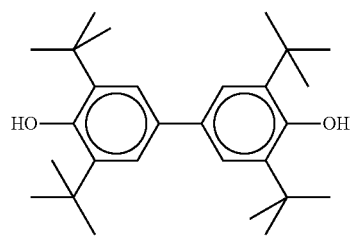
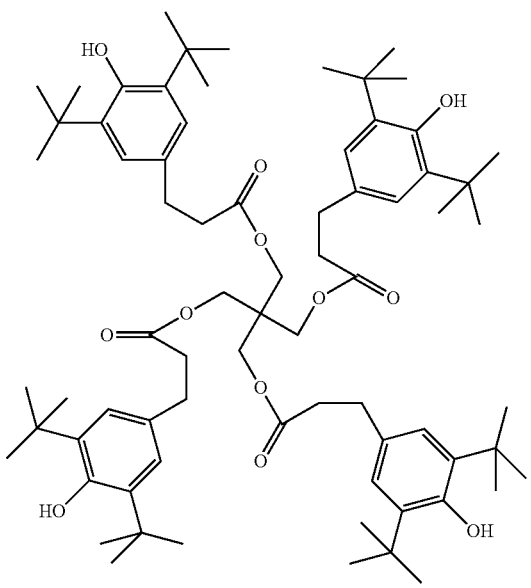
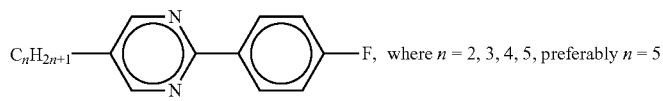
where $n = 2, 3, 4, 5$, preferably $n = 5$
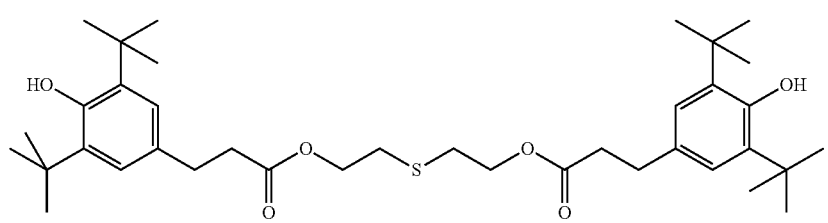 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE D-continued
Stabilisers which can be added, for example, to the mixtures according to
the invention in amounts of 0-10% by weight are mentioned below.
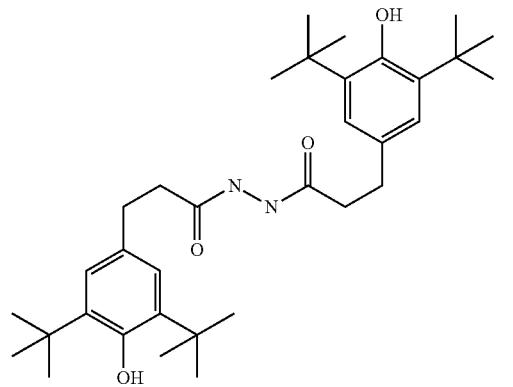 [SMILES: CC(C)(C)c1cc(CCC(=O)NNC(=O)CCc2cc(C(C)(C)C)c(O)c(C(C)(C)C)c2)cc(C(C)(C)C)c1O]
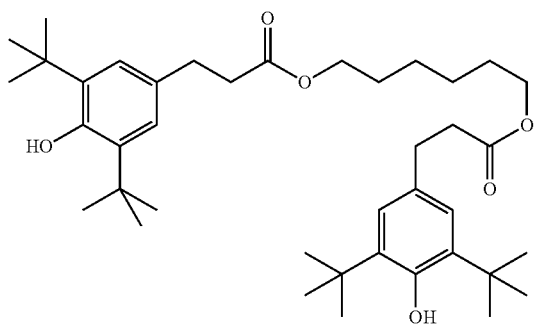 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
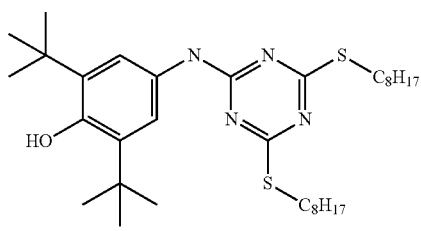
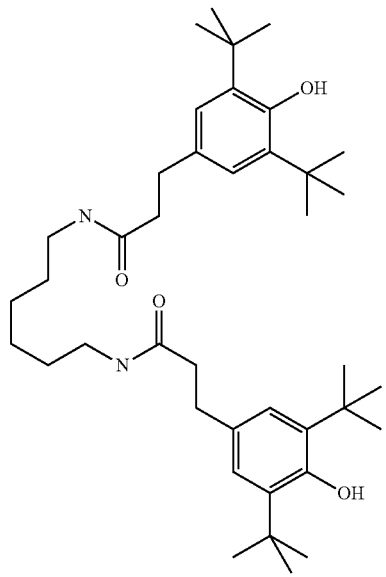 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE D-continued
Stabilisers which can be added, for example, to the mixtures according to the invention in amounts of 0-10% by weight are mentioned below.
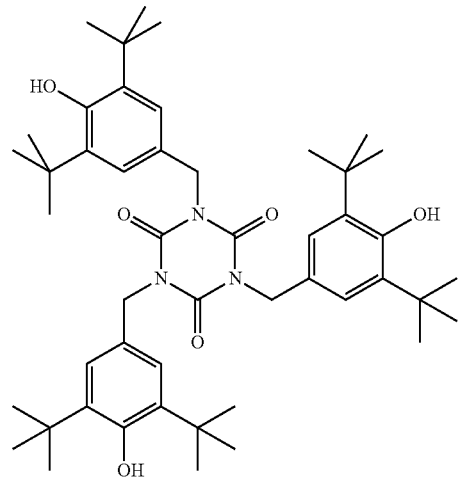 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
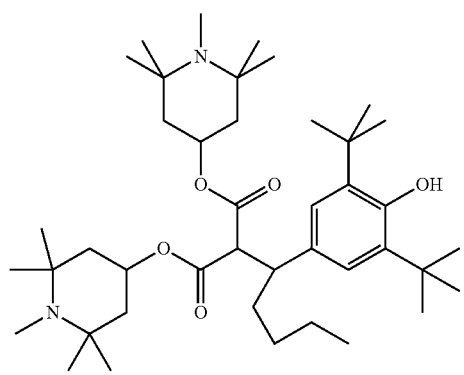 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
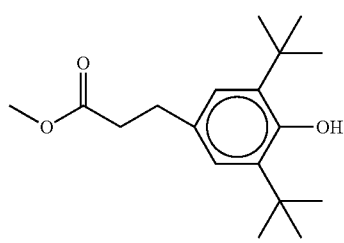
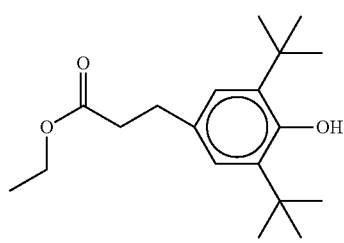
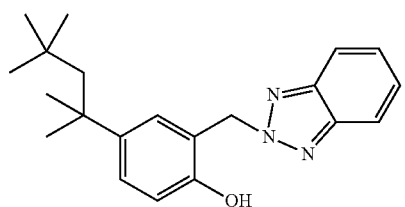 [SMILES: CC(C)(C)CC(C)(C)c1ccc(O)c(Cn2nc3ccccc3n2)c1]

TABLE D-continued
Stabilisers which can be added, for example, to the mixtures according to the invention in amounts of 0-10% by weight are mentioned below.
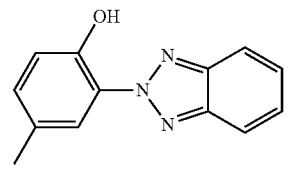 [SMILES: Cc1ccc(O)c(-n2nc3ccccc3n2)c1]
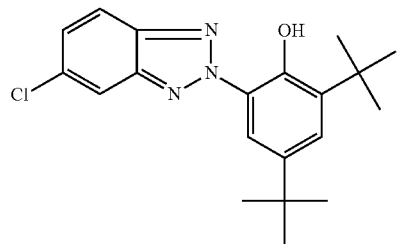 [SMILES: CC(C)(C)c1cc(-n2nc3ccc(Cl)cc3n2)c(O)c(C(C)(C)C)c1]
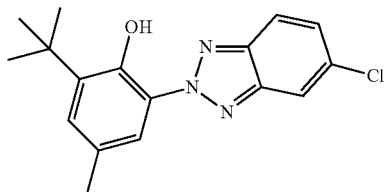 [SMILES: Cc1cc(-n2nc3ccc(Cl)cc3n2)c(O)c(C(C)(C)C)c1]
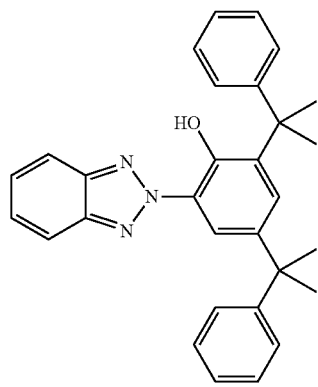 [SMILES: CC(C)(c1ccccc1)c1cc(-n2nc3ccccc3n2)c(O)c(C(C)(C)c2ccccc2)c1]
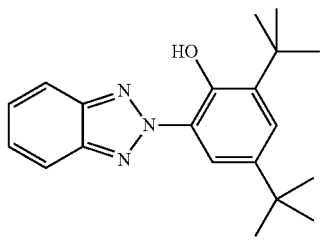 [SMILES: CC(C)(C)c1cc(-n2nc3ccccc3n2)c(O)c(C(C)(C)C)c1]
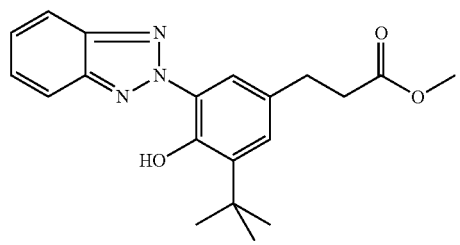 [SMILES: COC(=O)CCc1cc(-n2nc3ccccc3n2)c(O)c(C(C)(C)C)c1]

TABLE D-continued
Stabilisers which can be added, for example, to the mixtures according to the invention in amounts of 0-10% by weight are mentioned below.
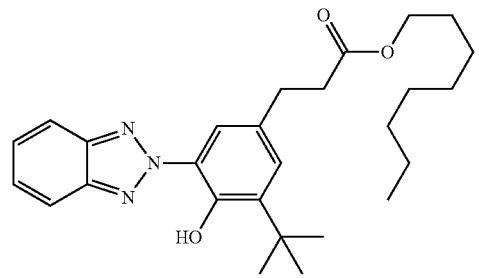 [SMILES: CCCCCCCCOC(=O)CCc1cc(-n2nc3ccccc3n2)c(O)c(C(C)(C)C)c1]
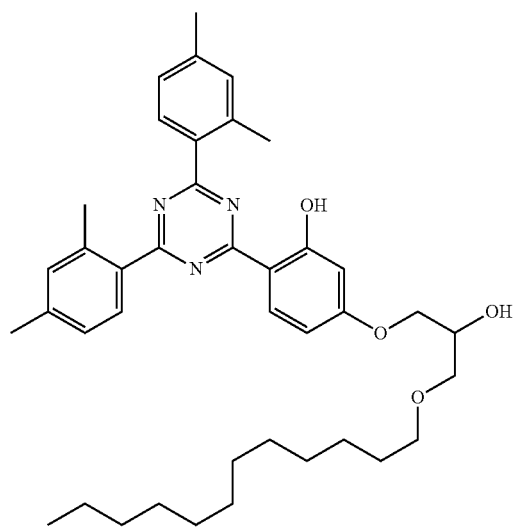
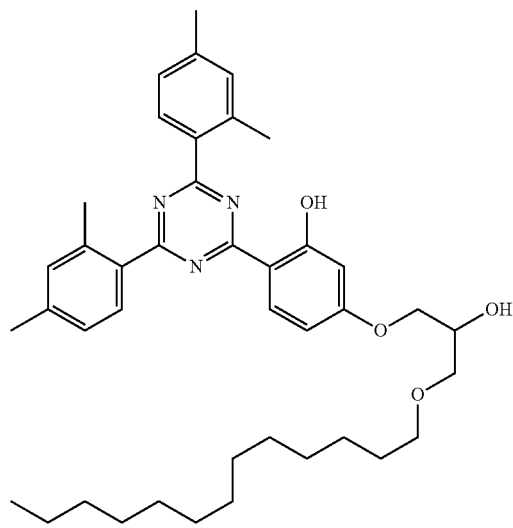

TABLE D-continued

Stabilisers which can be added, for example, to the mixtures according to the invention in amounts of 0-10% by weight are mentioned below.

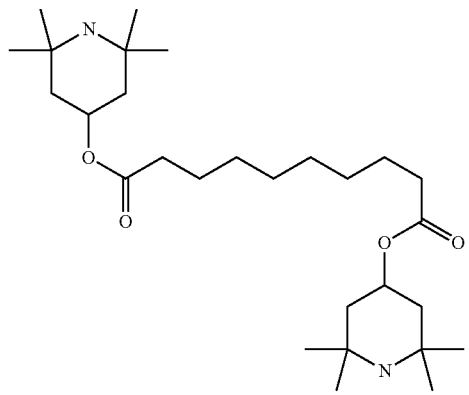

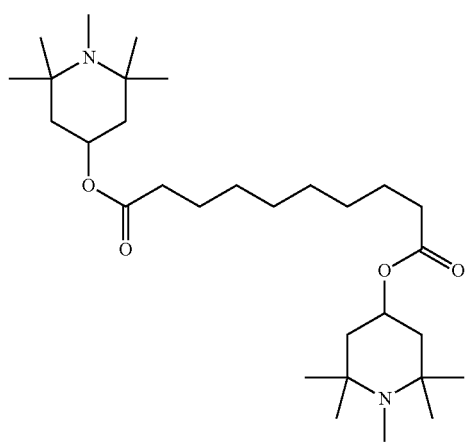

The following examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, Δn denotes the optical anisotropy at 589 nm and 20° C., $\gamma_1$ denotes the rotational viscosity (mPa·s) at 20° C., $V_{10}$ denotes the voltage (V) for 10% transmission (viewing angle perpendicular to the plate surface), (threshold voltage), Δ∈ denotes the dielectric anisotropy at 20° C. and 1 kHz (Δ∈=∈$_\parallel$−∈$_\perp$, where ∈$_\parallel$ denotes the dielectric constant parallel to the longitudinal axes of the molecules and ∈$_\perp$ denotes the dielectric constant perpendicular thereto).

The electro-optical data are measured in a TN cell at the 1st minimum (i.e. at a d·Δn value of 0.5 μm) at 20° C., unless expressly indicated otherwise. The optical data are measured at 20° C., unless expressly indicated otherwise. All physical properties are determined in accordance with "Merck Liquid Crystals, Physical Properties of Liquid Crystals", status November 1997, Merck KGaA, Germany, and apply for a temperature of 20° C., unless explicitly indicated otherwise.

EXAMPLE 1

| | | | |
|---|---|---|---|
| CC-3-V | 34.00% | Clearing point [° C.]: | 77.5 |
| ACQU-3-F | 10.00% | Δn [589 nm, 20° C.]: | 0.1146 |
| PUQU-3-F | 15.00% | Δ∈ [kHz, 20° C.]: | +18.7 |
| CCP-V-1 | 8.00% | $\gamma_1$ [mPa·s, 20° C.]: | 100 |
| APUQU-2-F | 6.00% | $V_{10}$ [V]: | 1.02 |
| APUQU-3-F | 7.00% | | |
| PGUQU-3-F | 9.00% | | |
| CPGU-3-OT | 4.00% | | |
| DPGU-3-F | 7.00% | | |

EXAMPLE 2

| | | | |
|---|---|---|---|
| CC-3-V | 32.00% | Clearing point [° C.]: | 76 |
| ACQU-3-F | 15.00% | S→N [° C.]: | −30 |
| PUQU-3-F | 15.00% | Δn [589 nm, 20° C.]: | 0.1115 |
| CCP-V-1 | 7.00% | Δ∈ [kHz, 20° C.]: | +18.8 |
| APUQU-2-F | 6.00% | $\gamma_1$ [mPa·s, 20° C.]: | 99 |
| APUQU-3-F | 7.00% | $V_{10}$ [V]: | 1.01 |
| PGUQU-3-F | 8.00% | | |

-continued

| | |
|---|---|
| CPGU-3-OT | 5.00% |
| DPGU-3-F | 5.00% |

EXAMPLE 3

| | | | |
|---|---|---|---|
| CC-3-V | 30.00% | Clearing point [° C.]: | 74 |
| ACQU-2-F | 6.00% | S→N [° C.]: | −30 |
| ACQU-3-F | 12.00% | $\Delta n$ [589 nm, 20° C.]: | 0.1095 |
| PUQU-3-F | 15.00% | $\Delta \epsilon$ [kHz, 20° C.]: | +19.3 |
| CCP-V-1 | 7.00% | $\gamma_1$ [mPa·s, 20° C.]: | 103 |
| APUQU-2-F | 6.00% | $V_{10}$ [V]: | 0.97 |
| APUQU-3-F | 7.00% | | |
| PGUQU-3-F | 7.00% | | |
| CPGU-3-OT | 5.00% | | |
| DPGU-3-F | 5.00% | | |

EXAMPLE 4

| | | | |
|---|---|---|---|
| CC-3-V | 34.00% | Clearing point [° C.]: | 74 |
| ACQU-2-F | 3.00% | S→N [° C.]: | −30 |
| ACQU-3-F | 12.00% | $\Delta n$ [589 nm, 20° C.]: | 0.1109 |
| PUQU-3-F | 14.00% | $\Delta \epsilon$ [kHz, 20° C.]: | +17.7 |
| PGP-2-4 | 2.00% | $\gamma_1$ [mPa·s, 20° C.]: | 94 |
| CCP-V-1 | 5.00% | $V_{10}$ [V]: | 1.01 |
| APUQU-2-F | 6.00% | | |
| APUQU-3-F | 7.00% | | |
| PGUQU-3-F | 7.00% | | |
| CPGU-3-OT | 5.00% | | |
| DPGU-3-F | 5.00% | | |

EXAMPLE 5

| | | | |
|---|---|---|---|
| CC-3-V | 27.00% | Clearing point [° C.]: | 74.5 |
| ACQU-2-F | 7.00% | S→N [° C.]: | −25 |
| ACQU-3-F | 12.00% | $\Delta n$ [589 nm, 20° C.]: | 0.1132 |
| PUQU-3-F | 15.00% | $\Delta \epsilon$ [kHz, 20° C.]: | +20.2 |
| CCP-V-1 | 8.00% | $\gamma_1$ [mPa·s, 20° C.]: | 106 |
| PGP-2-4 | 3.00% | $V_{10}$ [V]: | 0.96 |
| APUQU-2-F | 6.00% | | |
| APUQU-3-F | 7.00% | | |
| PGUQU-3-F | 7.00% | | |
| DPGU-3-F | 2.00% | | |
| DPGU-4-F | 3.00% | | |
| DPGU-5-F | 3.00% | | |

EXAMPLE 6

| | |
|---|---|
| CC-3-V | 30.00% |
| ACQU-2-F | 4.00% |
| ACQU-3-F | 12.00% |
| PUQU-3-F | 15.00% |
| CCP-V-1 | 9.50% |
| PGP-2-4 | 2.50% |
| APUQU-2-F | 6.00% |
| APUQU-3-F | 7.00% |
| PGUQU-3-F | 7.00% |

-continued

| | |
|---|---|
| DPGU-3-F | 4.00% |
| DPGU-4-F | 3.00% |

EXAMPLE 7

| | | | |
|---|---|---|---|
| CC-3-V | 45.00% | Clearing point [° C.]: | 79 |
| CC-3-V1 | 10.00% | $\Delta n$ [589 nm, 20° C.]: | 0.1104 |
| PGU-3-F | 4.00% | $\Delta \epsilon$ [kHz, 20° C.]: | +4.8 |
| PUQU-3-F | 7.00% | $\gamma_1$ [mPa·s, 20° C.]: | 52 |
| CCP-V-1 | 11.00% | $V_{10}$ [V]: | 1.93 |
| PGP-2-2V | 13.00% | | |
| PGUQU-3-F | 3.00% | | |
| DPGU-4-F | 7.00% | | |

EXAMPLE 8

| | | | |
|---|---|---|---|
| CC-3-V | 40.00% | Clearing point [° C.]: | 75 |
| CC-3-V1 | 8.00% | $\Delta n$ [589 nm, 20° C.]: | 0.1146 |
| PUQU-3-F | 12.00% | $\Delta \epsilon$ [kHz, 20° C.]: | +8.5 |
| PGU-3-F | 6.00% | $\gamma_1$ [mPa·s, 20° C.]: | 59 |
| PGP-2-2V | 8.00% | $V_{10}$ [V]: | 1.47 |
| CCP-V-1 | 10.50% | | |
| APUQU-3-F | 3.50% | | |
| PGUQU-3-F | 5.00% | | |
| DPGU-4-F | 7.00% | | |

EXAMPLE 9

| | | | |
|---|---|---|---|
| CC-3-V | 44.00% | Clearing point [° C.]: | 75.5 |
| CC-3-V1 | 5.00% | $\Delta n$ [589 nm, 20° C.]: | 0.1255 |
| PGU-3-F | 8.00% | $\Delta \epsilon$ [kHz, 20° C.]: | +8.6 |
| PUQU-3-F | 5.00% | $\gamma_1$ [mPa·s, 20° C.]: | 58 |
| PGP-2-2V | 13.00% | $V_{10}$ [V]: | 1.50 |
| CPU-3-OXF | 9.00% | | |
| APUQU-2-F | 4.00% | | |
| PGUQU-3-F | 5.00% | | |
| DPGU-4-F | 7.00% | | |

EXAMPLE 10

| | | | |
|---|---|---|---|
| CC-3-V | 44.00% | Clearing point [° C.]: | 74.5 |
| PGP-2-3 | 3.00% | $\Delta n$ [589 nm, 20° C.]: | 0.1147 |
| CPU-3-OXF | 20.00% | $\Delta \epsilon$ [kHz, 20° C.]: | +12.3 |
| PUQU-3-F | 7.00% | $\gamma_1$ [mPa·s, 20° C.]: | 68 |
| APUQU-2-F | 6.00% | $V_{10}$ [V]: | 1.20 |
| APUQU-3-F | 8.00% | | |
| PGUQU-3-F | 6.00% | | |
| DPGU-4-F | 6.00% | | |

EXAMPLE 11

| | | | |
|---|---|---|---|
| CC-3-V | 39.00% | Clearing point [° C.]: | 74.5 |
| PGU-3-F | 7.00% | Δn [589 nm, 20° C.]: | 0.1125 |
| PUQU-3-F | 14.00% | Δε [kHz, 20° C.]: | +12.9 |
| CCP-V-1 | 16.00% | γ₁ [mPa · s, 20° C.]: | 72 |
| APUQU-2-F | 5.00% | $V_{10}$ [V]: | 1.17 |
| APUQU-3-F | 6.00% | | |
| PGUQU-3-F | 7.00% | | |
| DPGU-3-F | 3.00% | | |
| DPGU-4-F | 3.00% | | |

EXAMPLE 12

| | | | |
|---|---|---|---|
| CC-3-V | 37.50% | Clearing point [° C.]: | 74 |
| CC-3-V1 | 8.50% | Δn [589 nm, 20° C.]: | 0.1222 |
| PGP-2-2V | 8.00% | Δε [kHz, 20° C.]: | +12.3 |
| CCP-V-1 | 3.00% | γ₁ [mPa · s, 20° C.]: | 69 |
| PGU-3-F | 9.00% | $V_{10}$ [V]: | 1.23 |
| PUQU-3-F | 10.00% | | |
| PGUQU-3-F | 4.00% | | |
| APUQU-2-F | 6.00% | | |
| APUQU-3-F | 6.00% | | |
| DPGU-4-F | 8.00% | | |

EXAMPLE 13

| | | | |
|---|---|---|---|
| CC-3-V | 30.00% | Clearing point [° C.]: | 74 |
| ACQU-3-F | 12.00% | Δn [589 nm, 20° C.]: | 0.1117 |
| PGU-3-F | 7.00% | Δε [kHz, 20° C.]: | +18.3 |
| PUQU-3-F | 14.00% | γ₁ [mPa · s, 20° C.]: | 96 |
| CCP-V-1 | 10.00% | $V_{10}$ [V]: | 0.99 |
| CDUQU-3-F | 8.00% | | |
| APUQU-3-F | 6.00% | | |
| PGUQU-3-F | 7.00% | | |
| DPGU-3-F | 3.00% | | |
| DPGU-4-F | 3.00% | | |

EXAMPLE 14

| | | | |
|---|---|---|---|
| CC-3-V | 29.50% | Clearing point [° C.]: | 74.5 |
| ACQU-3-F | 11.50% | Δn [589 nm, 20° C.]: | 0.1131 |
| PGU-3-F | 7.00% | Δε [kHz, 20° C.]: | +18.8 |
| PUQU-3-F | 14.00% | γ₁ [mPa·s, 20° C.]: | 102 |
| CCP-V-1 | 10.00% | $V_{10}$ [V]: | 0.98 |
| CDUQU-3-F | 8.00% | | |
| APUQU-3-F | 7.00% | | |
| PGUQU-3-F | 7.00% | | |
| DPGU-3-F | 3.00% | | |
| DPGU-4-F | 3.00% | | |

EXAMPLE 15

| | | | |
|---|---|---|---|
| CC-3-V | 19.00% | Clearing point [° C.]: | 73.5 |
| PGU-3-F | 6.00% | Δn [589 nm, 20° C.]: | 0.1125 |
| ACQU-2-F | 12.00% | Δε [kHz, 20° C.]: | +23.8 |
| ACQU-3-F | 14.00% | γ₁ [mPa · s, 20° C.]: | 131 |
| PUQU-3-F | 13.00% | $V_{10}$ [V]: | 0.86 |
| CCP-V-1 | 10.00% | | |
| APUQU-2-F | 8.00% | | |
| APUQU-3-F | 7.00% | | |
| PGUQU-3-F | 3.00% | | |
| DPGU-4-F | 8.00% | | |

Examples 1-15 are particularly suitable for TN-TFT applications.

EXAMPLE 16

IPS Mixture

| | | | |
|---|---|---|---|
| PGUQU-3-F | 7.00% | Clearing point [° C.]: | 82 |
| PGP-2-4 | 6.00% | Δn [589 nm, 20° C.]: | 0.1015 |
| CCP-V-1 | 11.00% | Δε [kHz, 20° C.]: | +7.4 |
| CC-3-V | 50.00% | γ₁ [mPa · s, 20° C.]: | 60 |
| CC-3-V1 | 4.00% | | |
| APUQU-2-F | 8.00% | | |
| APUQU-3-F | 7.00% | | |
| DPGU-3-F | 7.00% | | |

EXAMPLE 17

IPS Mixture

| | | | |
|---|---|---|---|
| PGUQU-3-F | 6.00% | Clearing point [° C.]: | 89.5 |
| PGU-3-F | 7.00% | Δn [589 nm, 20° C.]: | 0.1299 |
| GGP-3-Cl | 4.00% | Δε [kHz, 20° C.]: | +7.1 |
| CP-3-Cl | 3.00% | γ₁ [mPa · s, 20° C.]: | 76 |
| CC-3-V | 38.00% | | |
| CCP-V-1 | 15.00% | | |
| CCP-V2-1 | 3.00% | | |
| PGP-2-3 | 6.00% | | |
| PGP-2-4 | 6.00% | | |
| APUQU-2-F | 5.00% | | |
| DPGU-3-F | 7.00% | | |

EXAMPLE 18

OCB Mixture

| | | | |
|---|---|---|---|
| DPGU-3-F | 5.00% | Clearing point [° C.]: | 99.5 |
| PGU-2-F | 4.00% | Δn [589 nm, 20° C.]: | 0.1398 |
| PGU-3-F | 8.00% | Δε [kHz, 20° C.]: | +10.1 |
| PPGU-3-F | 2.00% | γ₁ [mPa · s, 20° C.]: | 112 |
| PUQU-3-F | 7.00% | $V_{10}$ [V]: | 1.30 |
| PGUQU-3-F | 8.00% | | |
| CC-4-V | 22.00% | | |
| CC-3-V1 | 10.00% | | |
| CCP-V-1 | 18.00% | | |
| CCP-V2-1 | 2.00% | | |
| CPGP-4-3 | 6.00% | | |
| CP-3-Cl | 2.00% | | |
| GGP-3-Cl | 6.00% | | |

EXAMPLE 19

OCB Mixture

| | | | |
|---|---|---|---|
| DPGU-3-F | 3.00% | Clearing point [° C.]: | 99 |
| BCH-2F.F | 5.00% | Δn [589 nm, 20° C.]: | 0.1599 |
| CC-4-V | 12.00% | Δε [kHz, 20° C.]: | +13.8 |
| CCH-34 | 4.00% | γ₁ [mPa·s, 20° C.]: | 159 |
| CCP-V-1 | 5.00% | | |
| CP-3-Cl | 4.00% | | |
| CPGP-4-3 | 4.00% | | |
| CPGP-5-2 | 9.00% | | |
| CPGP-5-3 | 7.00% | | |
| CPP-2-F | 3.00% | | |
| CPP-3-F | 3.00% | | |
| PGU-3-F | 6.00% | | |
| PGU-5-F | 8.00% | | |
| PGUQU-3-F | 5.00% | | |
| PUQU-2-F | 6.00% | | |
| PUQU-3-F | 16.00% | | |

The invention claimed is:

1. A liquid-crystalline medium comprising one or more compounds of formula I:

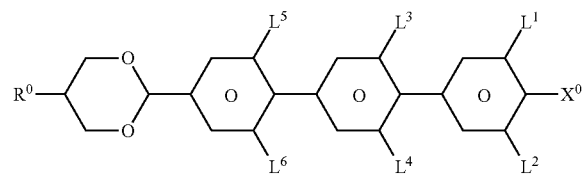

I in which
R⁰ denotes an alkyl or alkoxy radical having 1 to 15 C atoms, where, in addition, one or more CH₂ groups in these radicals may each be replaced, independently of one another, by —C≡C—, —CF₂O—, —CH=CH—,

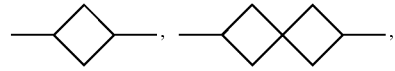

—O—, —CO—O— or —O—CO— in such a way that O atoms are not linked directly to one another, and where, in addition, one or more H atoms are each optionally replaced by a halogen atom, X⁰ denotes F, Cl, CN, SF₅, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms, and L¹⁻⁶ each, independently of one another, denote H or F.

2. The liquid-crystalline medium according to claim 1, wherein said medium further comprises one or more compounds of formulae II and/or III:

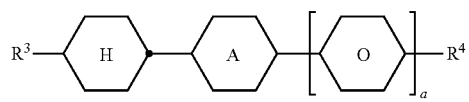

II

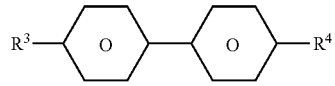

III in which
A denotes 1,4-phenylene or trans-1,4-cyclohexylene,
a denotes 0 or 1,
R³ denotes alkenyl having 2 to 9 C atoms, and
R⁴ is an alkyl or alkoxy radical having 1 to 15 C atoms, where, in addition, one or more CH₂ groups in these radicals may each be replaced, independently of one another, by —C≡C—, —CF₂O—, —CH=CH—,

—O—, —CO—O— or —O—CO— in such a way that O atoms are not linked directly to one another, and where, in addition, one or more H atoms are each optionally replaced by a halogen atom.

3. The liquid-crystalline medium according to claim 1, wherein said medium further comprises one or more compounds selected from the compounds of the formulae:

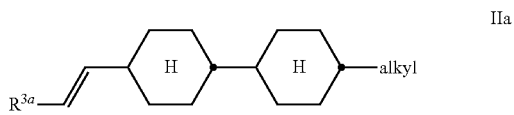

IIa

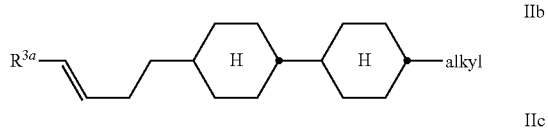

IIb

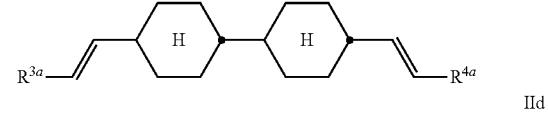

IIc

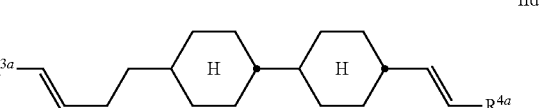

IId

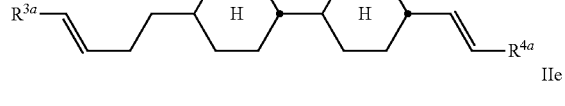

IIe

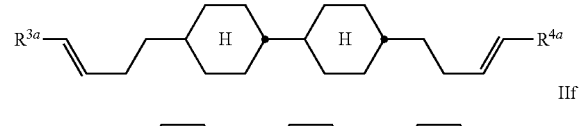

IIf

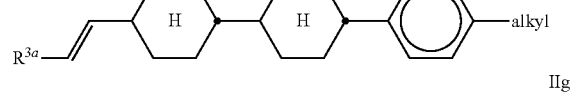

IIg

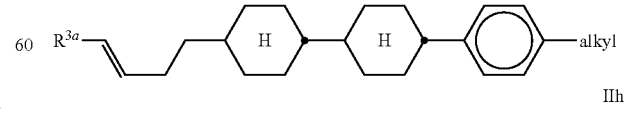

IIh

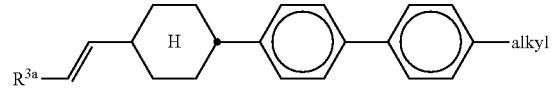

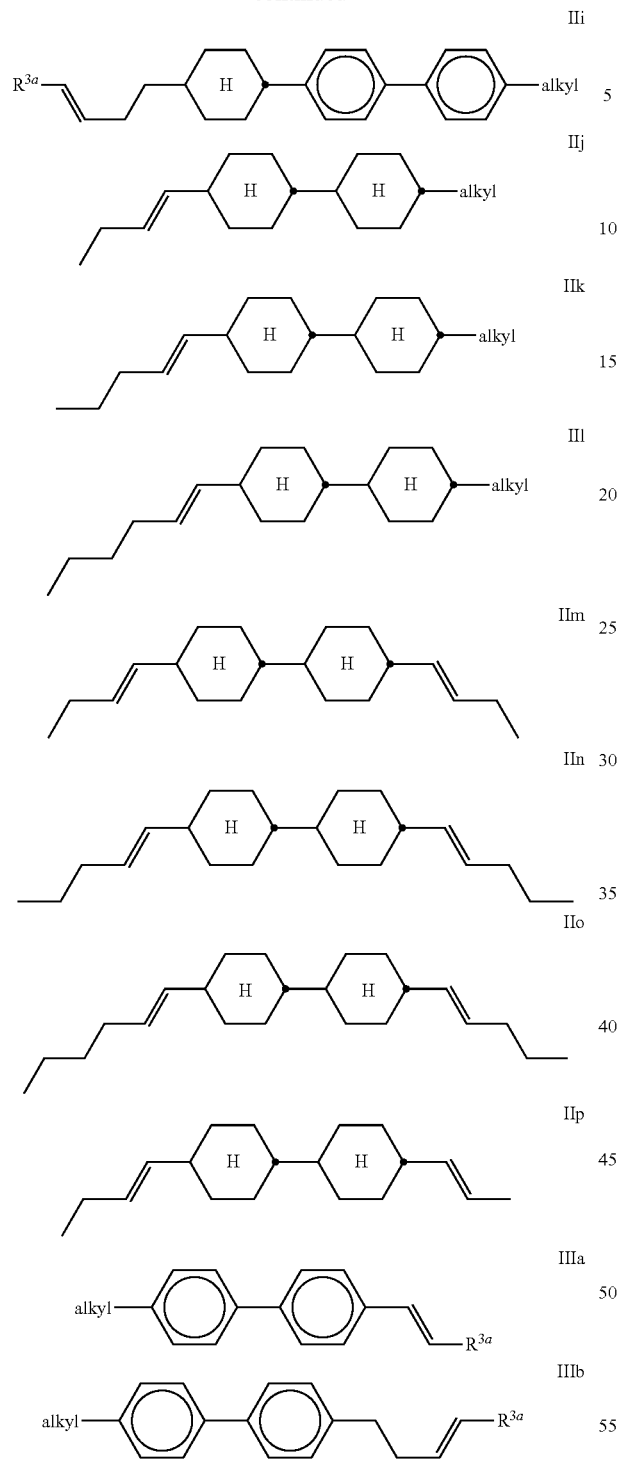

in which
- $R^{3a}$ and $R^{4a}$ each, independently of one another, denote H, $CH_3$, $C_2H_5$ or $C_3H_7$, and
- "alkyl" denotes a straight-chain alkyl group having 1 to 8 C atoms.

4. The liquid-crystalline medium according to claim 1, wherein said medium further comprises one or more compounds selected from the compounds of formulae IV to VIII:

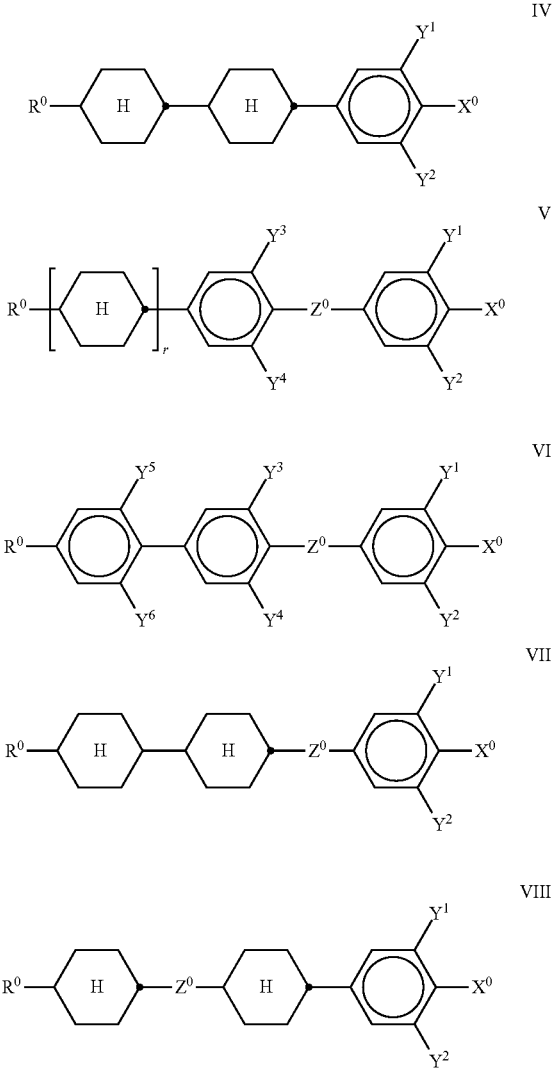

in which
- $Y^{1-6}$ each, independently of one another, denote H or F,
- $Z^0$ denotes $—C_2H_4—$, $—(CH_2)_4—$, $—CH=CH—$, $—CF=CF—$, $—C_2F_4—$, $—CH_2CF_2—$, $—CF_2CH_2—$, $—CH_2O—$, $—OCH_2—$, $—COO—$, $—CF_2O—$ or $—OCF_2—$, an in the formulae V and VIZ can also be a single bond, and
- r denotes 0 or 1.

5. The liquid-crystalline medium according to claim 1, wherein said medium further comprises one or more compounds selected from the compounds of formulae Va to Vg:

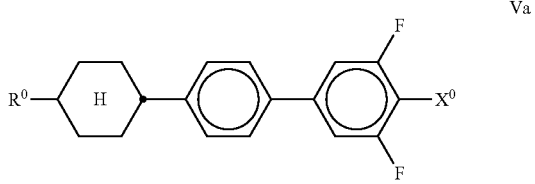

-continued

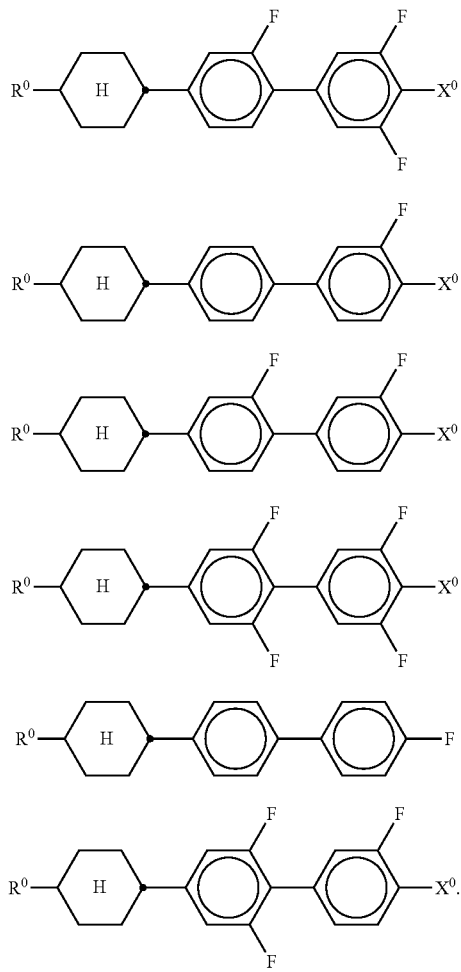

6. The liquid-crystalline medium according to claim 1, wherein said medium further comprises one or more compounds selected from the compounds of formulae VI-1a to VI-1d:

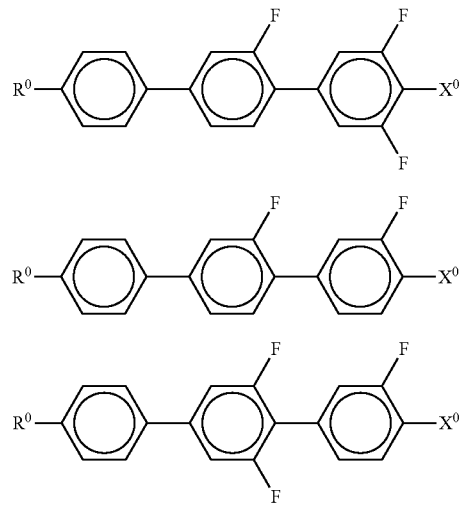

-continued

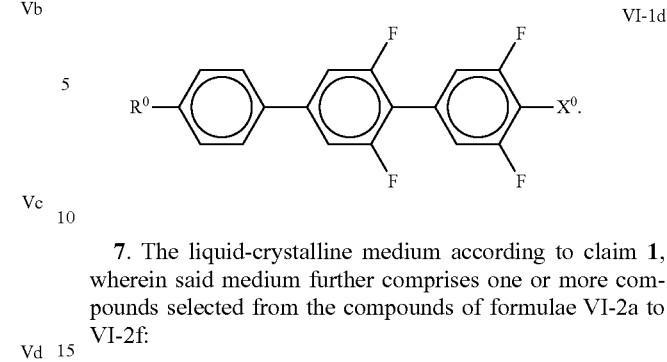

7. The liquid-crystalline medium according to claim 1, wherein said medium further comprises one or more compounds selected from the compounds of formulae VI-2a to VI-2f:

8. The liquid-crystalline medium according to claim 1, wherein said medium further comprises one or more compounds selected from the following formula:

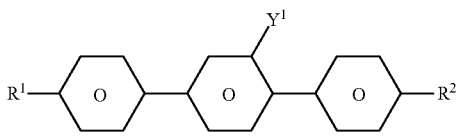
XIII in which
- R¹ and R² each, independently of one another, denote n-alkyl, alkoxy, oxaalkyl, fluoroalkyl or alkenyl, each having up to 9 C atoms, and
- Y¹ denotes H or F.

9. The liquid-crystalline medium according to claim 1, wherein said medium further comprises one or more compounds selected from the following formulae:

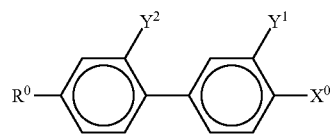
XIV

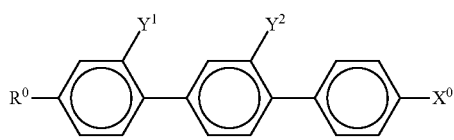
XV

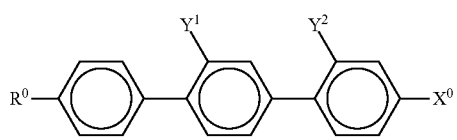
XVI

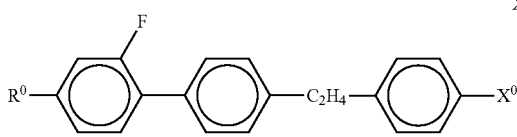
XVII in which
Y¹ and Y² are independently H or F.

10. The liquid-crystalline medium according to claim 1, wherein said medium further comprises one or more compounds of formula XIb

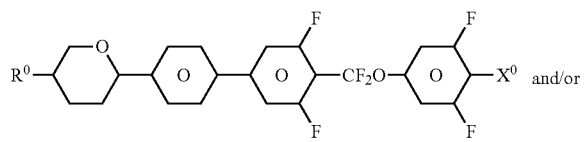
XIb and/or
one or more compounds of formula XXVI

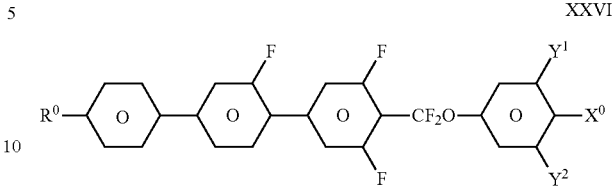
XXVI in which
Y¹ and Y² each, independently of one another, denote H or F.

11. The liquid-crystalline medium according to claim 1, wherein said medium contains 1-25% by weight of compounds of formula I.

12. The liquid-crystalline medium according to claim 1, wherein said medium further comprises one or more UV stabilizers and/or antioxidants.

13. An electro-optical liquid-crystal display containing a liquid-crystalline medium according to claim 1.

14. A process for the preparation of a liquid-crystalline medium according to claim 1, comprising: mixing one or more compounds of formula I with at least one further liquid-crystalline compound and optional additives.

15. A method of generating an electro-optical effect comprising applying a voltage to an electro-optical liquid-crystal display according to claim 13.

16. An electro-optical liquid-crystal display according to claim 13, wherein
said display is a TN, STN, FFS, OCB, IPS, TN-TFT or MLC display, and comprises two plane-parallel outer plates, which, together with a frame, form a cell, integrated non-linear elements for switching individual pixels on the outer plates, and
said cell contains said liquid-crystal medium, and said medium is nematic and has positive dielectric anisotropy.

17. The liquid-crystalline medium according to claim 1, wherein said one or more compounds of the formula I are selected from formulae I-1 to I-4:

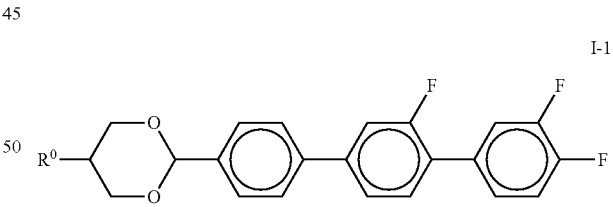
I-1

I-2

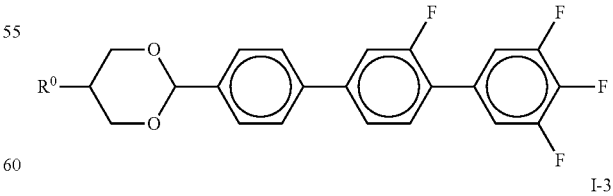

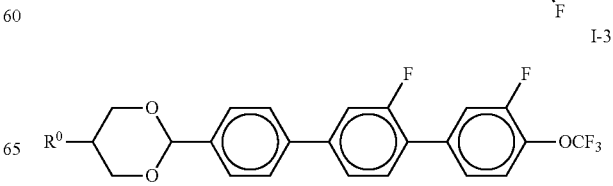
I-3

I-4

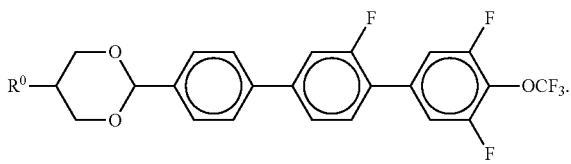

18. The liquid-crystalline medium according to claim 1, wherein
 $X^0$ is F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CH_2F$, $OCFHCF_2CF_3$, $OCFHCF_2CHF_2$, $OCH=CF_2$, $OCF=CF_2$, $OCF_2CHFCF_3$, $OCF_2CF_2CF_3$, $OCF_2CF_2CClF_2$, $OCClFCF_2CF_3$, $CF=CF_2$, $CF=CHF$ or $CH=CF_2$, and
 $R^0$ is straight-chain alkyl having 1 to 8 C atoms, alkoxy having 1 to 8 C atoms, or straight-chain alkenyl having 2 to 7 C atoms, or alkenyloxy having 2 to 7 C atoms.

19. The liquid-crystalline medium according to claim 2, wherein said medium contains 25-80% by weight of compounds of formulae II and/or III.

20. The liquid-crystalline medium according to claim 4, wherein said medium contains 5-40% by weight of compounds of the formula V.

21. The liquid-crystalline medium according to claim 8, wherein said medium contains 5-40% by weight of compounds of the formula XIII.

22. The liquid-crystalline medium according to claim 9, wherein said medium contains 1-25% by weight of compounds of the formula XIV.

23. The liquid-crystalline medium according to claim 9, wherein said medium contains 5-45% by weight of compounds of the formula XV.

24. The liquid-crystalline medium according to claim 9, wherein said medium contains 1-20% by weight of compounds of the formula XVII.

* * * * *